United States Patent [19]

Page et al.

[11] 4,307,988

[45] Dec. 29, 1981

[54] STORAGE SYSTEM

[76] Inventors: Peter H. Page, 131 Underhill Rd., Hamden, Conn. 06510; Harold L. Clark, 73 Russell Rd., Milldale, Conn. 06052

[21] Appl. No.: 895,455

[22] Filed: Apr. 11, 1978

Related U.S. Application Data

[63] Continuation of Ser. No. 675,560, Apr. 9, 1976, abandoned, which is a continuation of Ser. No. 212,912, Dec. 28, 1971, abandoned.

[51] Int. Cl.³ .............................................. B65G 1/16
[52] U.S. Cl. .................................. 414/276; 198/473; 414/279; 414/281; 414/285
[58] Field of Search ............... 414/267, 276, 277, 279, 414/281, 285, 911; 198/477, 473, 678, 812

[56] References Cited

U.S. PATENT DOCUMENTS

| | | | |
|---|---|---|---|
| 1,597,929 | 8/1926 | Sjolander et al. | 198/473 X |
| 2,645,396 | 7/1953 | Spohr | 198/477 X |
| 2,796,165 | 6/1957 | Carr | 198/473 |
| 3,379,321 | 4/1968 | Weir | 414/267 X |
| 3,454,148 | 7/1969 | Harrison | 198/477 |
| 3,601,270 | 8/1971 | Martin, Sr. | 414/592 |
| 3,674,159 | 7/1972 | Lemelson | 414/276 |

FOREIGN PATENT DOCUMENTS

| | | | |
|---|---|---|---|
| 1064420 | 8/1959 | Fed. Rep. of Germany | 414/267 |
| 1238313 | 7/1971 | United Kingdom | 414/276 |

Primary Examiner—Trygve M. Blix
Assistant Examiner—Edmond G. Rishell, Jr.
Attorney, Agent, or Firm—DeLio and Montgomery

[57] ABSTRACT

A storage system for articles comprising a plurality of inclined storage compartments where an unloading member on an elevator removes articles from given compartments and transfers the article to a conveyor from a transfer position on the elevator and the conveyor carries the articles to a delivery point.

18 Claims, 40 Drawing Figures

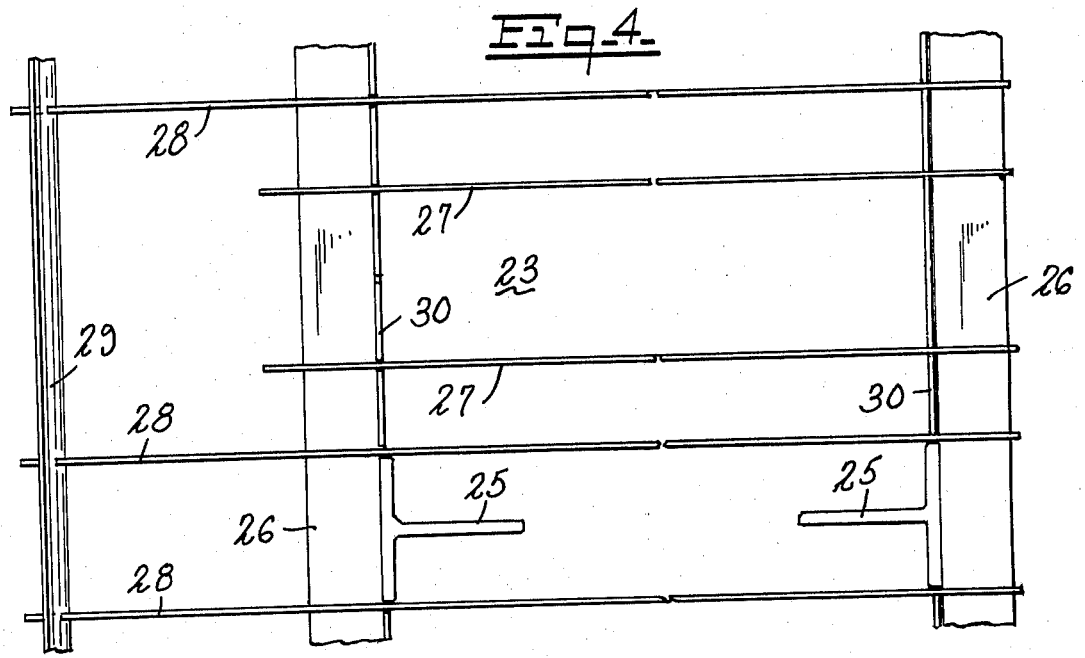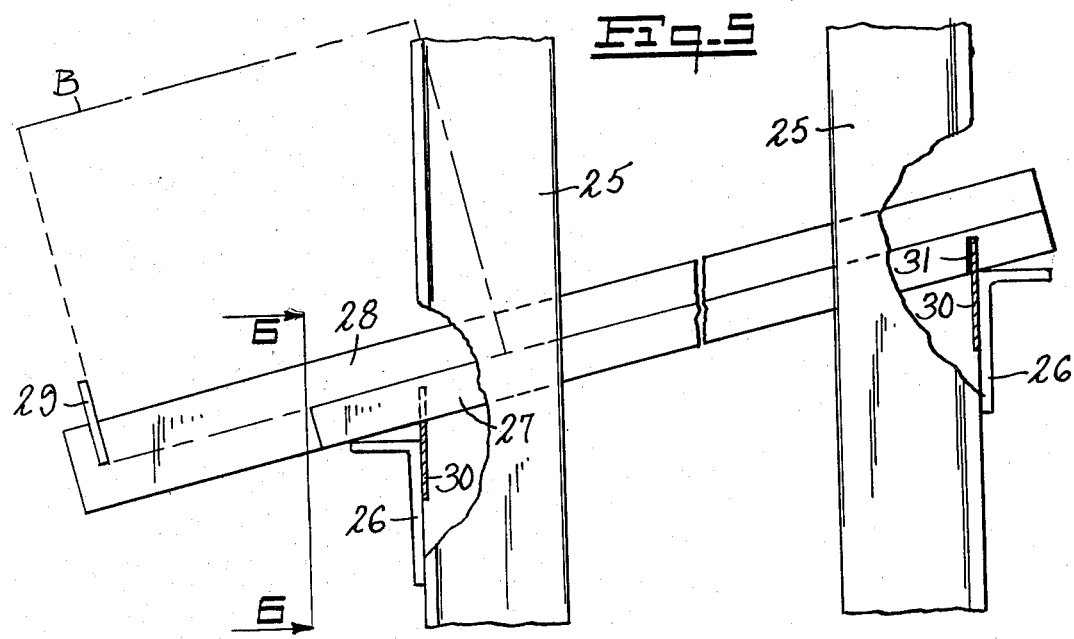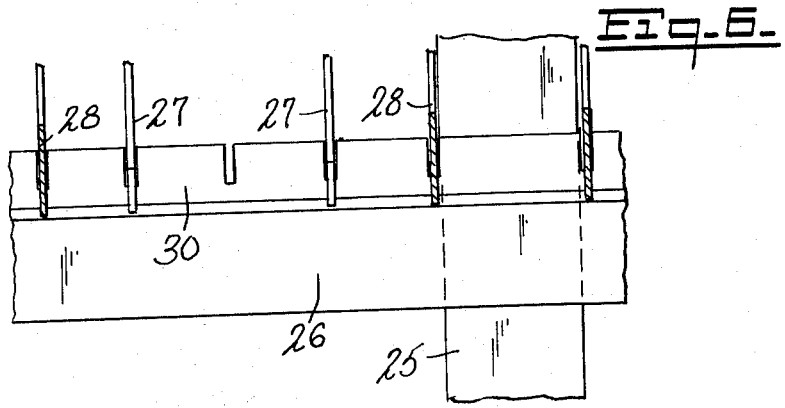

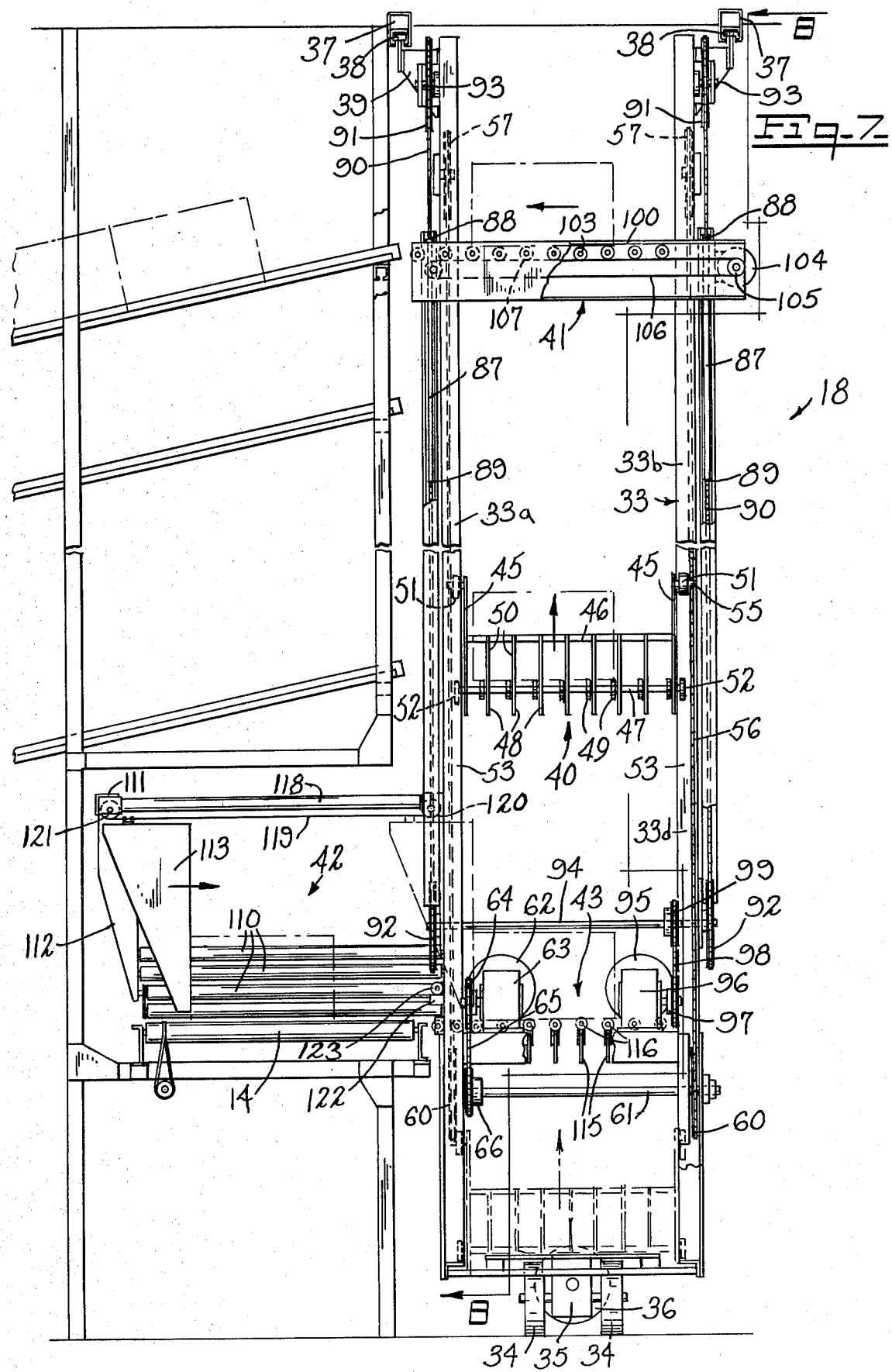

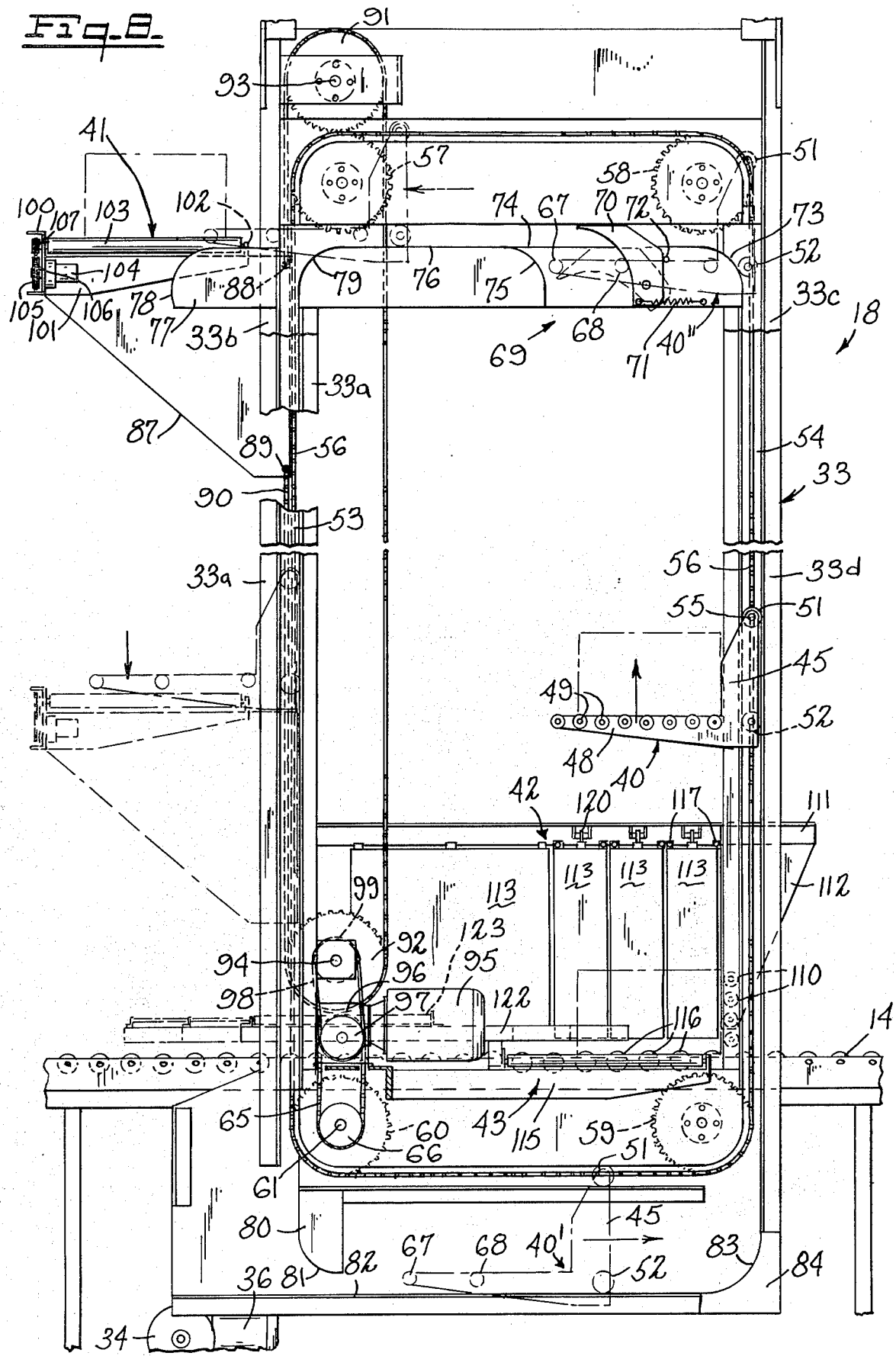

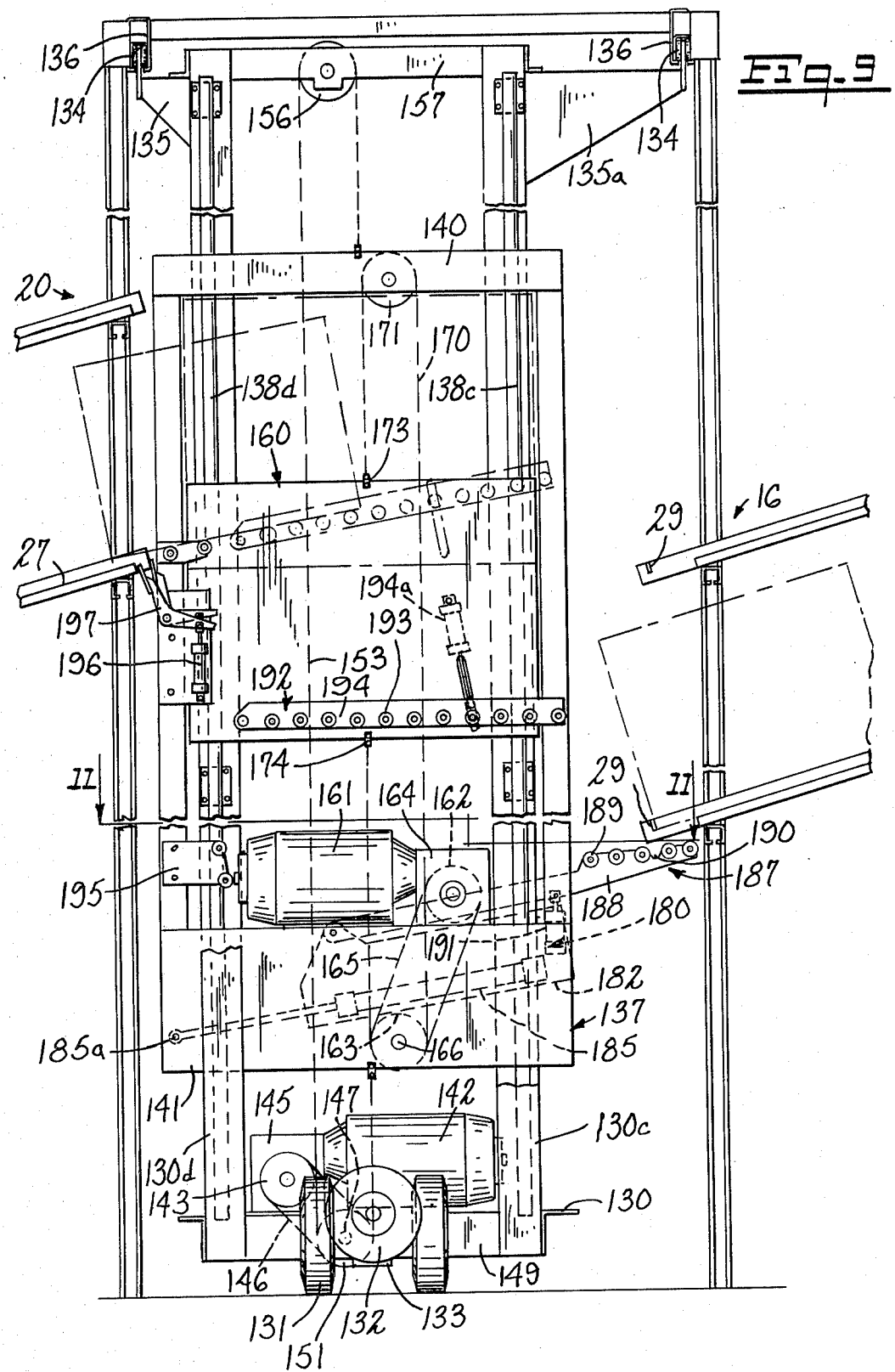

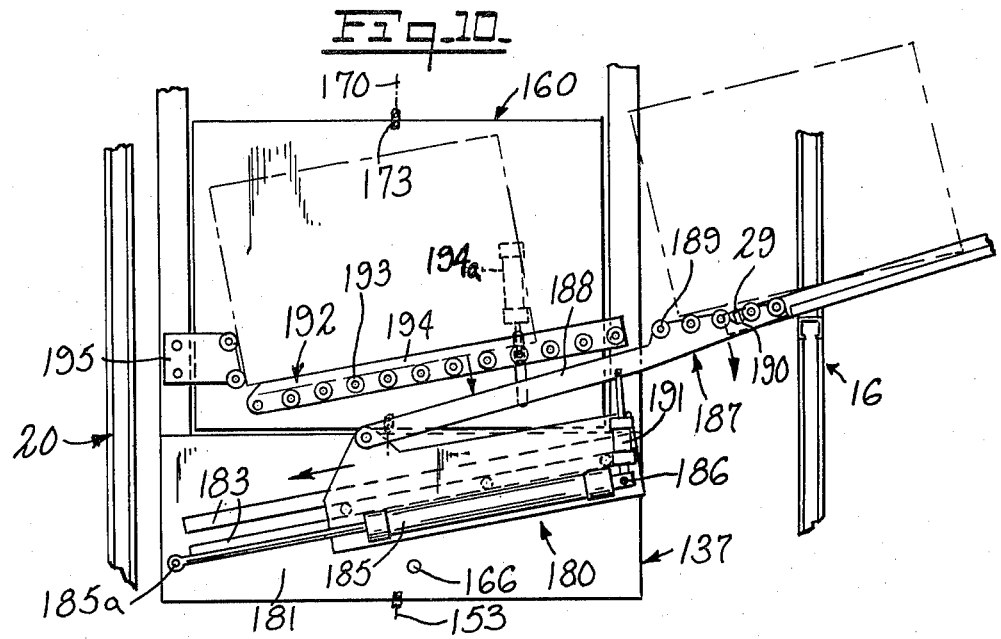
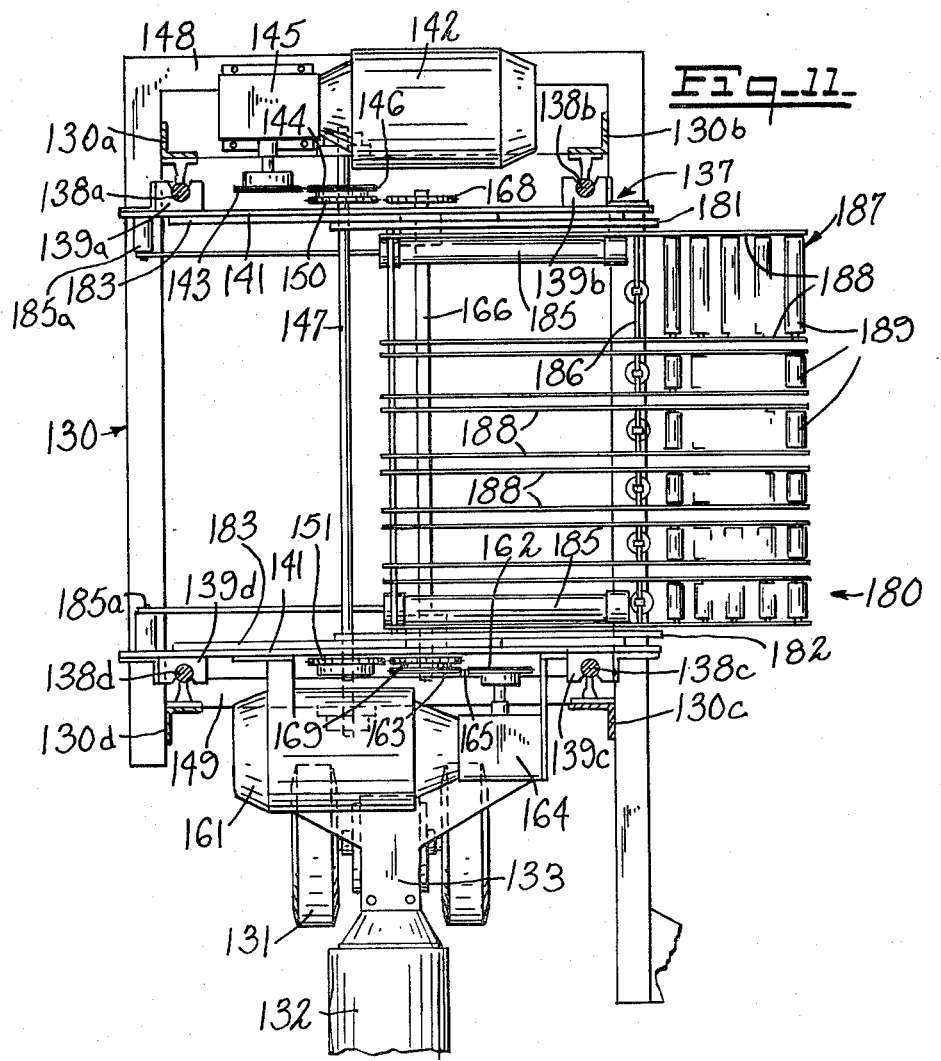

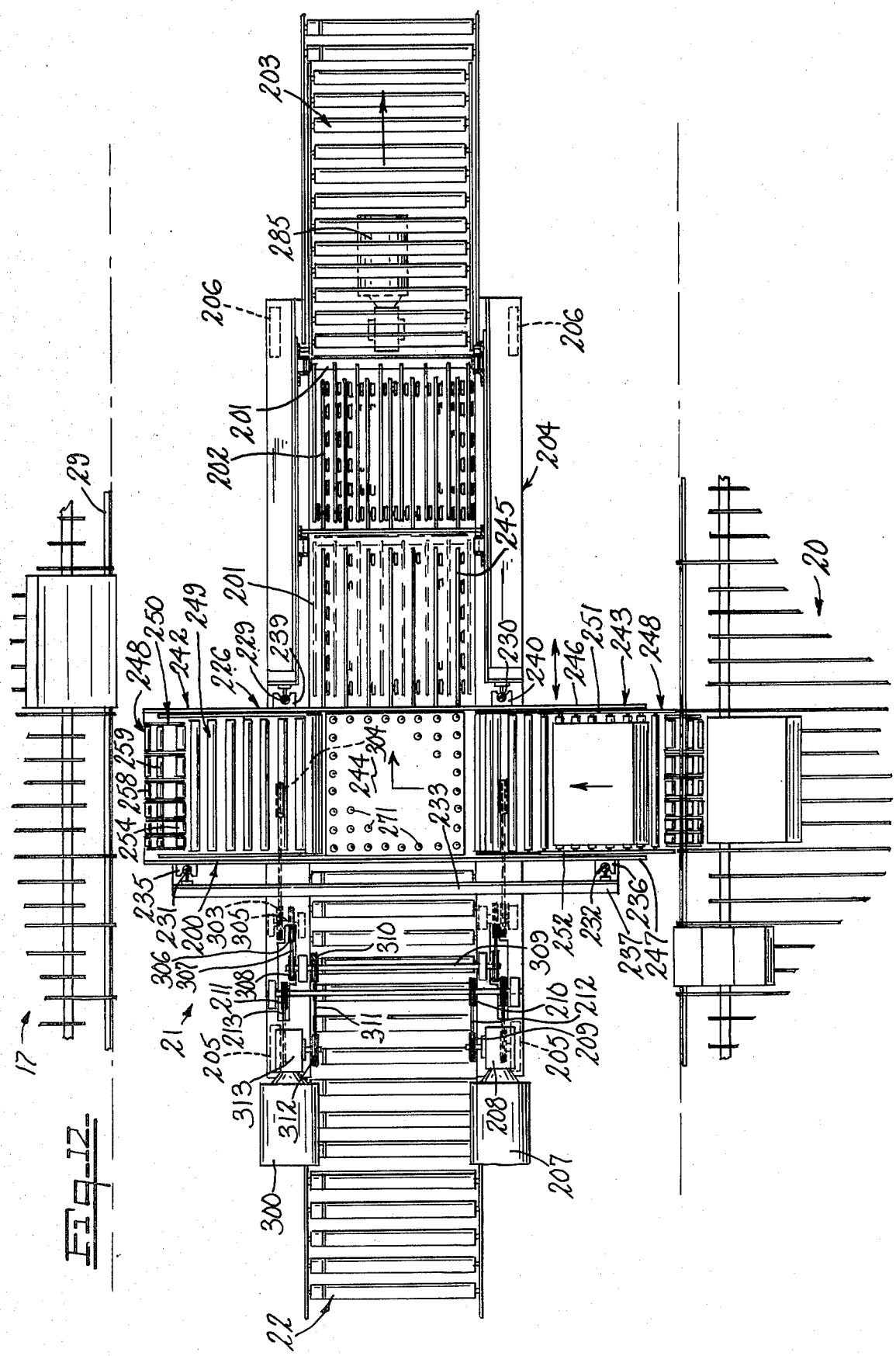

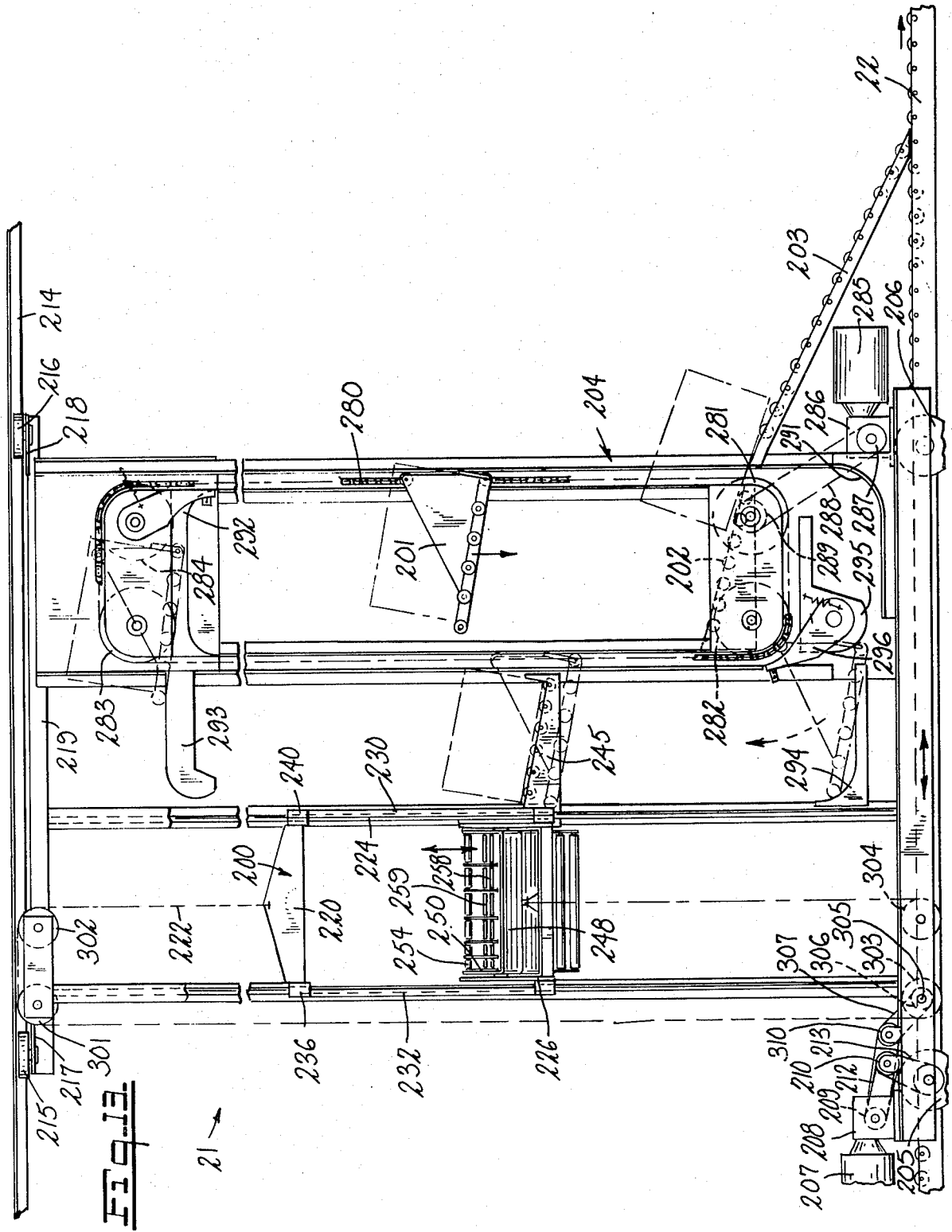

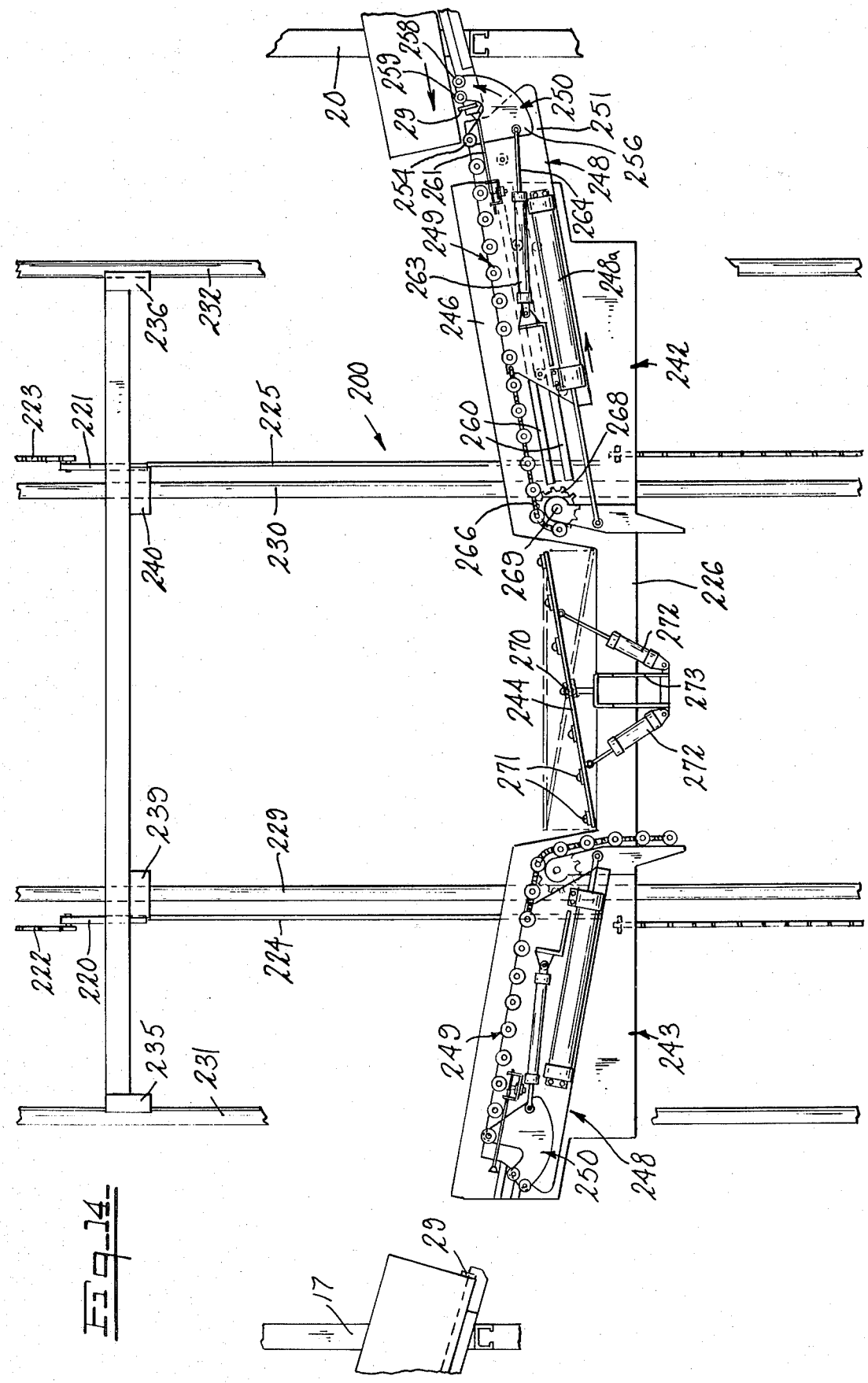
Fig_14

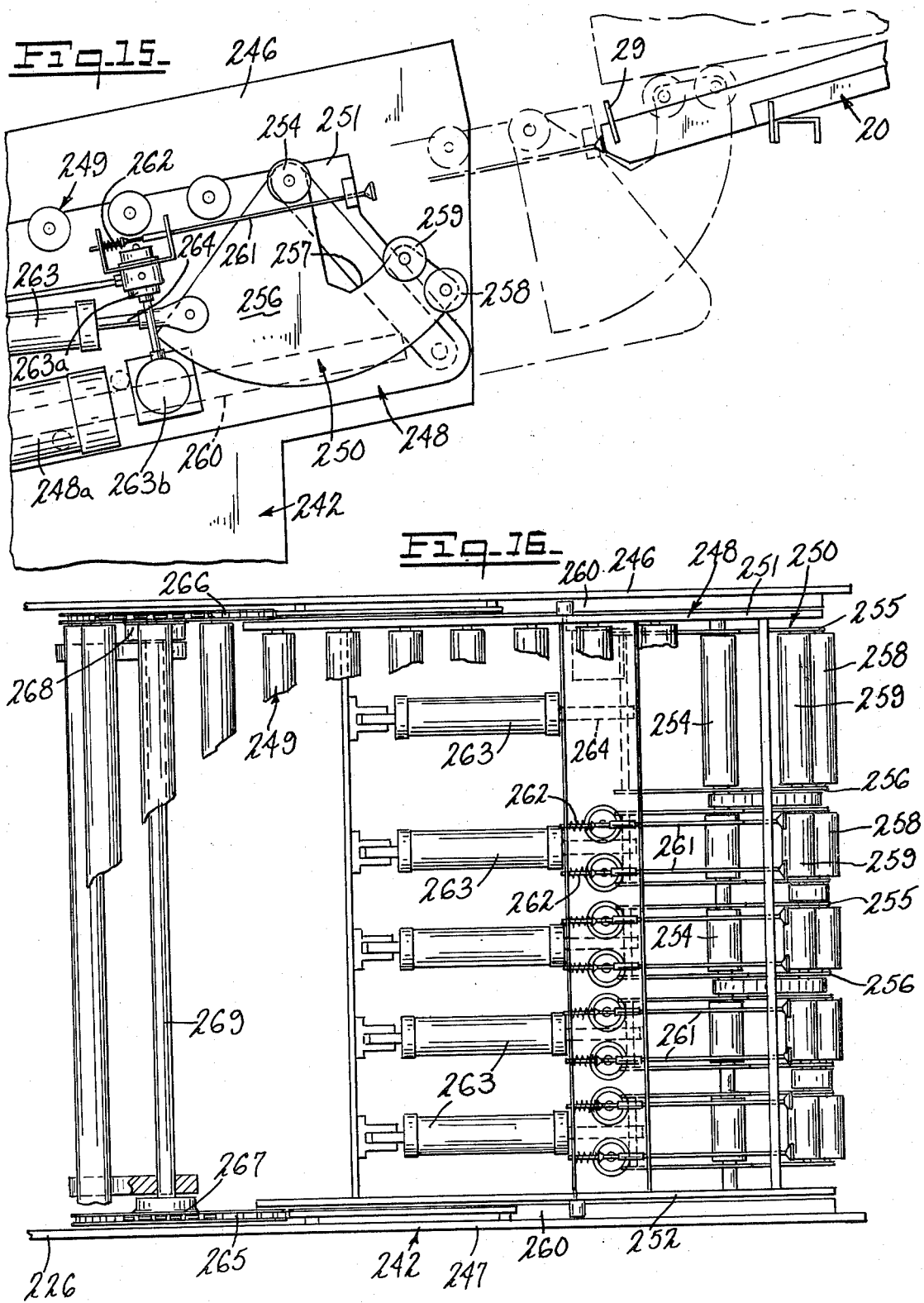

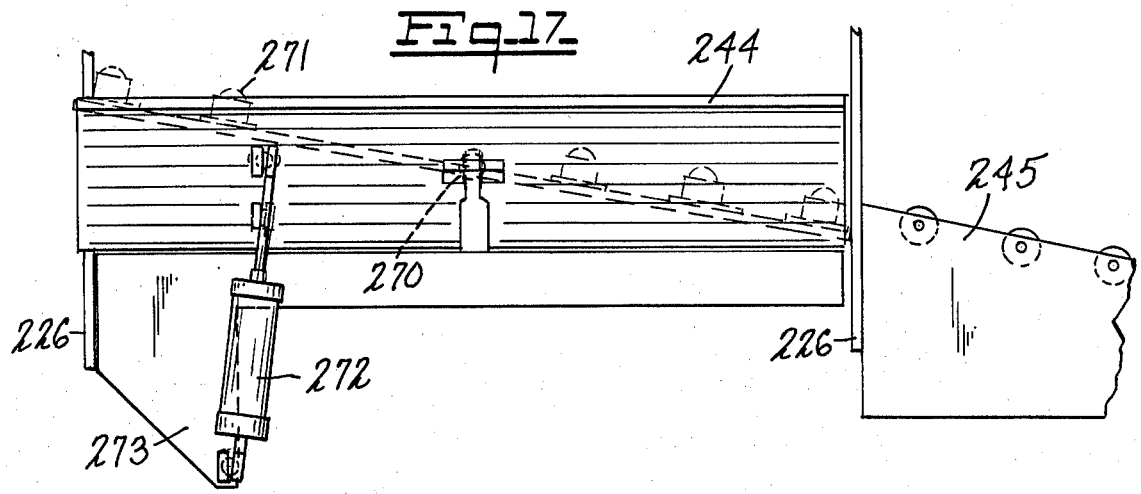
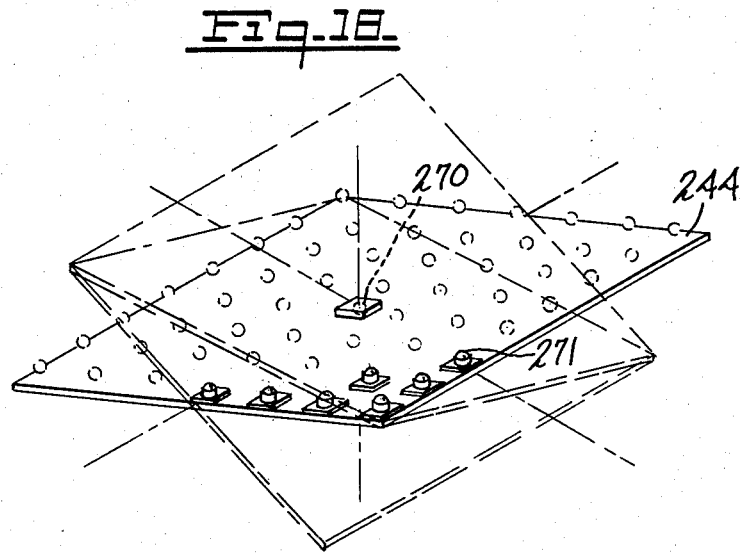

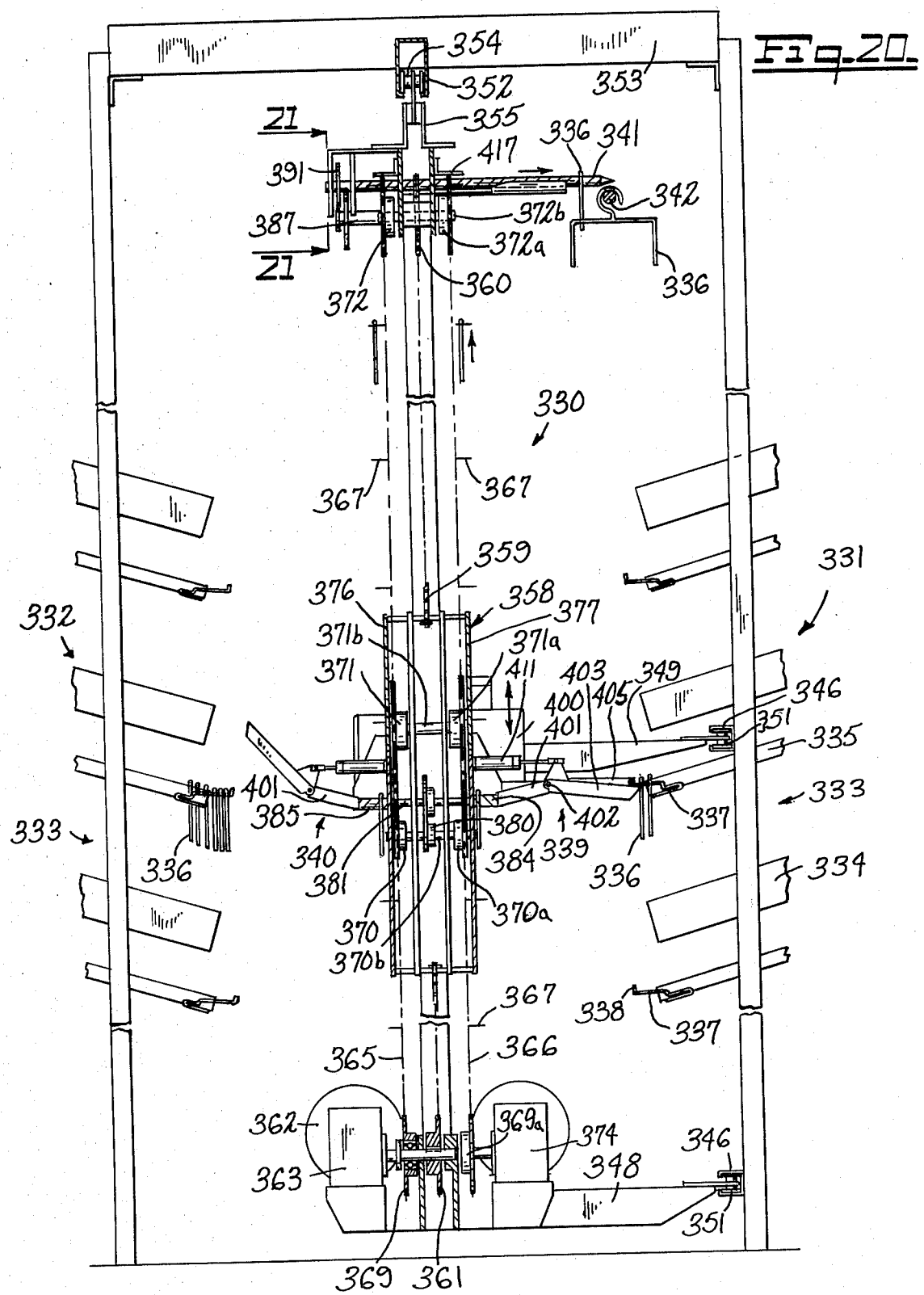

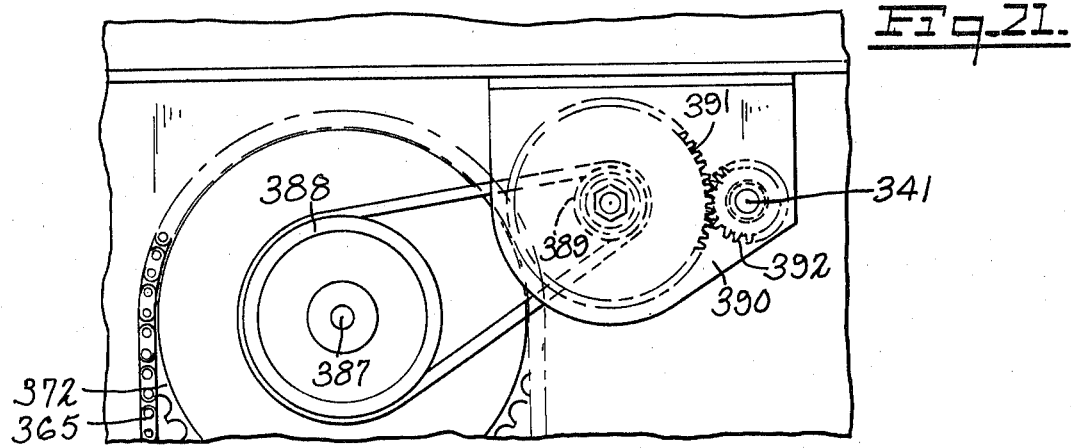
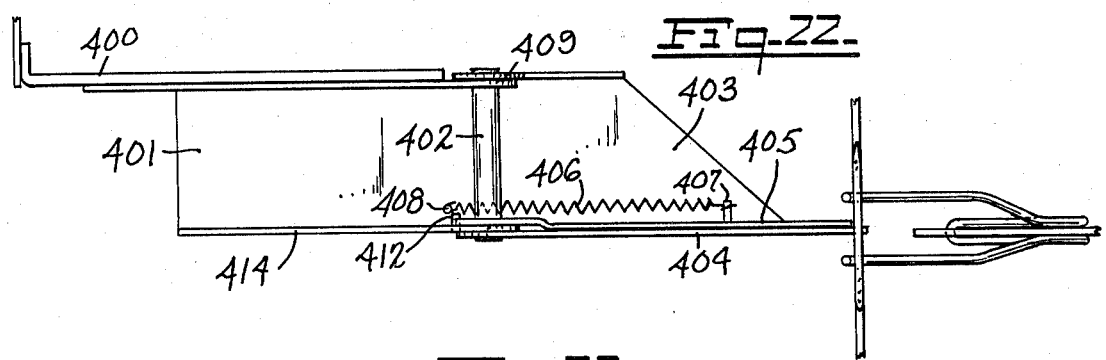
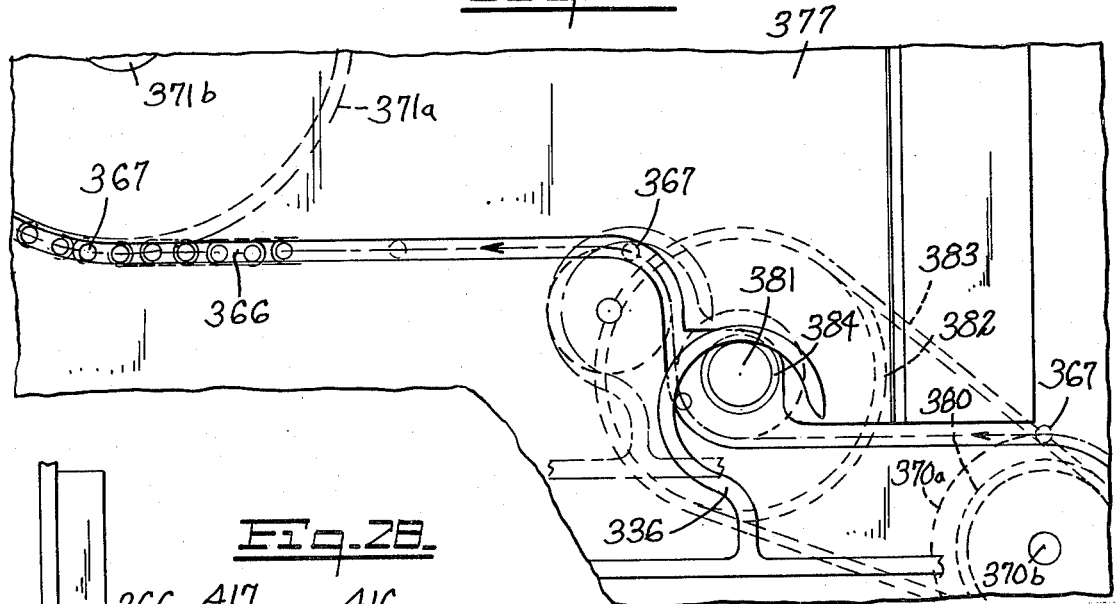
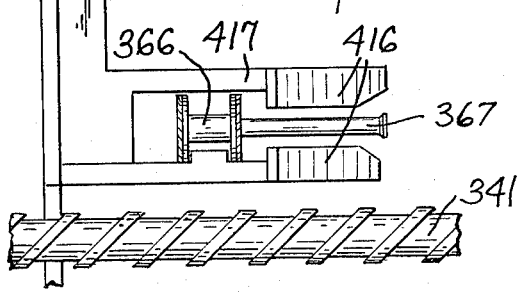

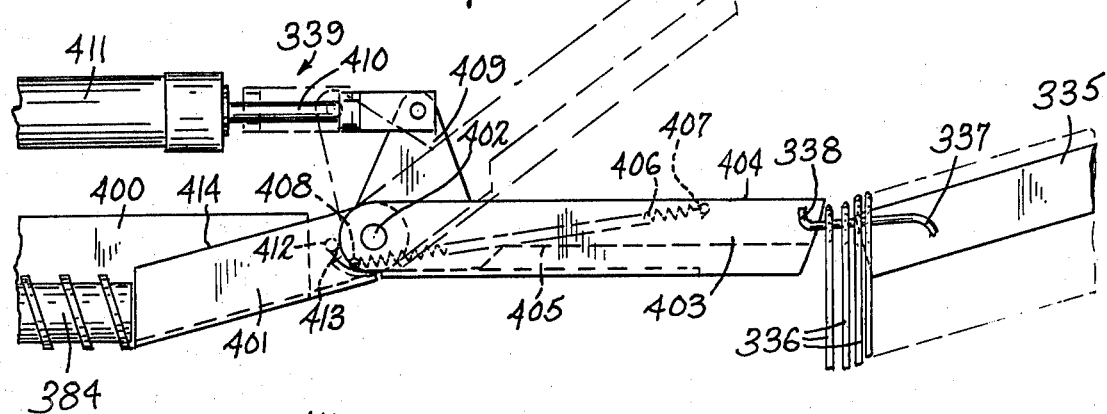
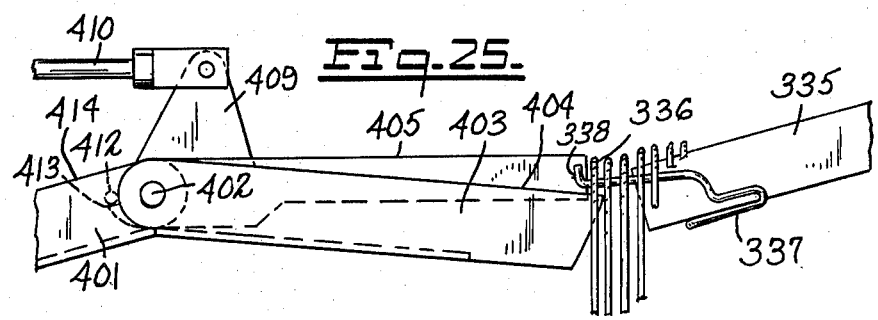
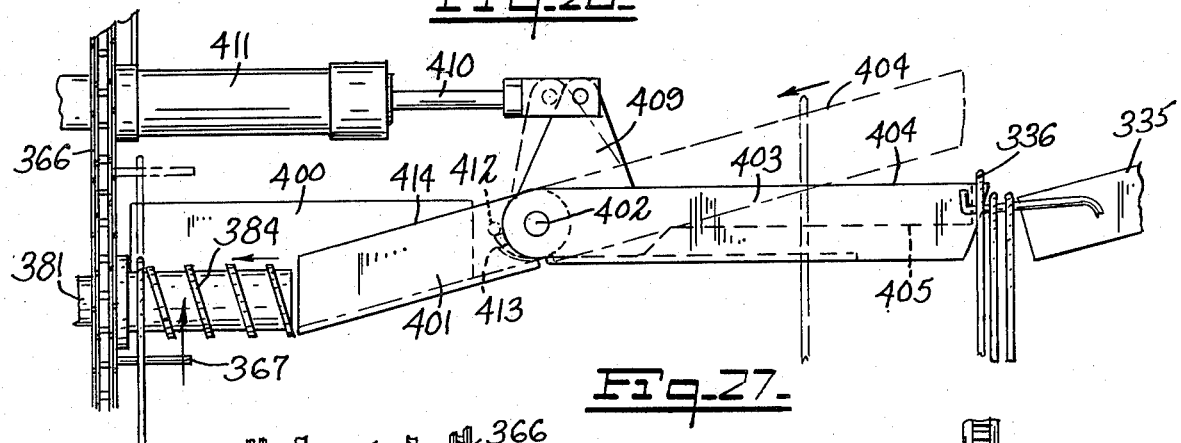
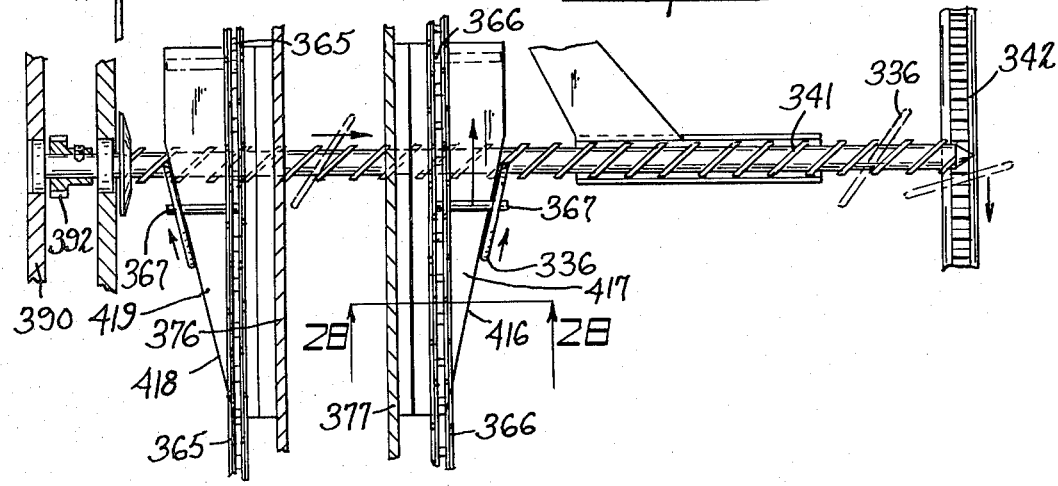

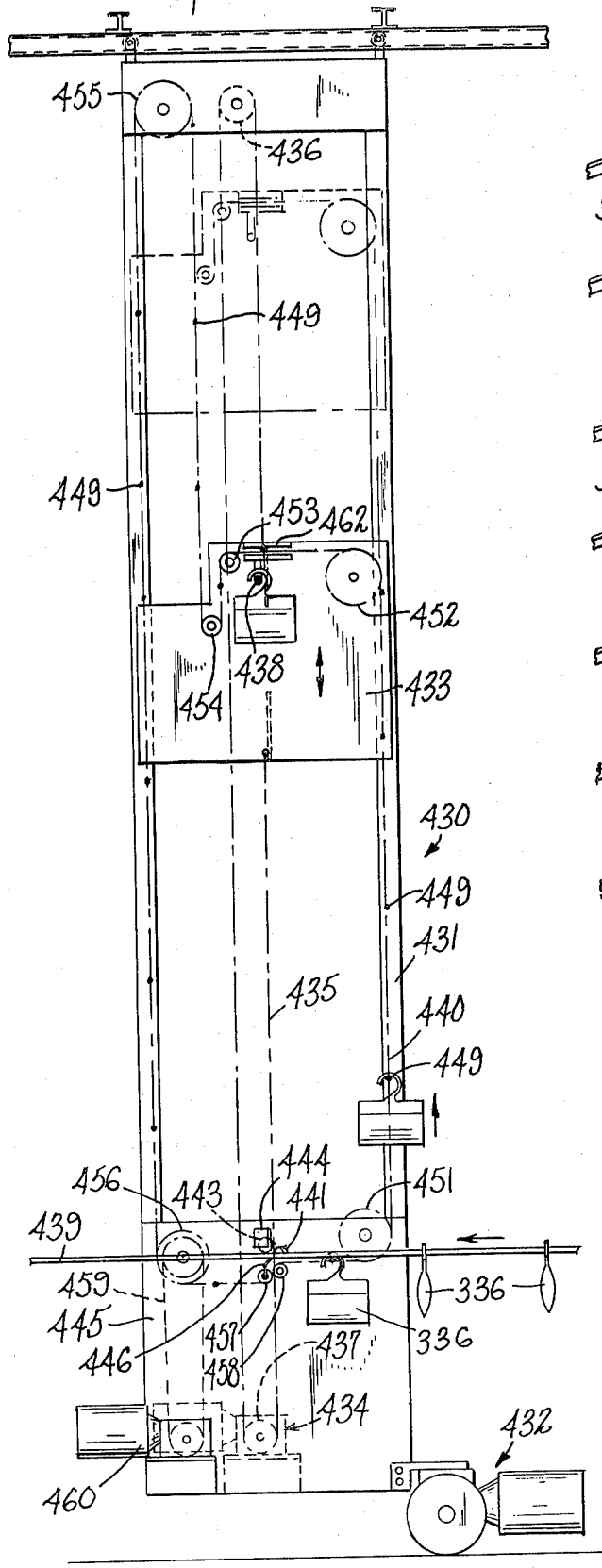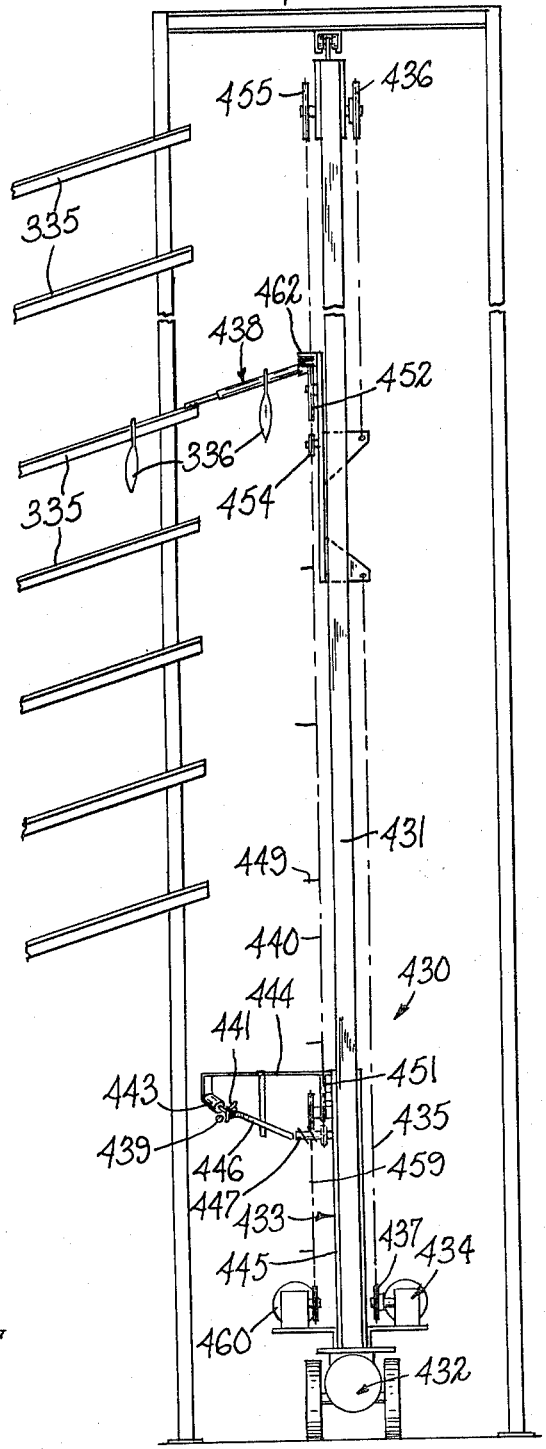

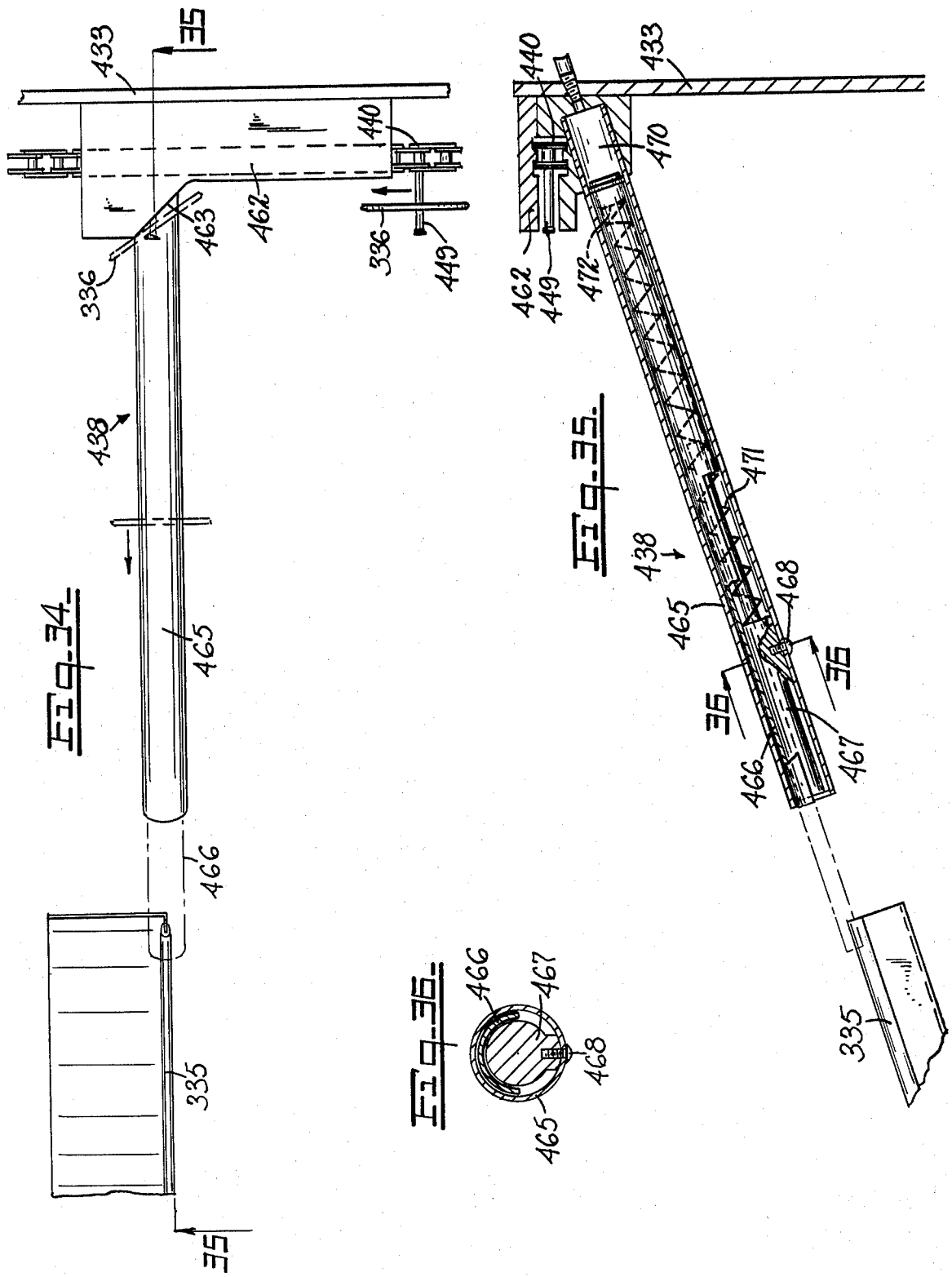

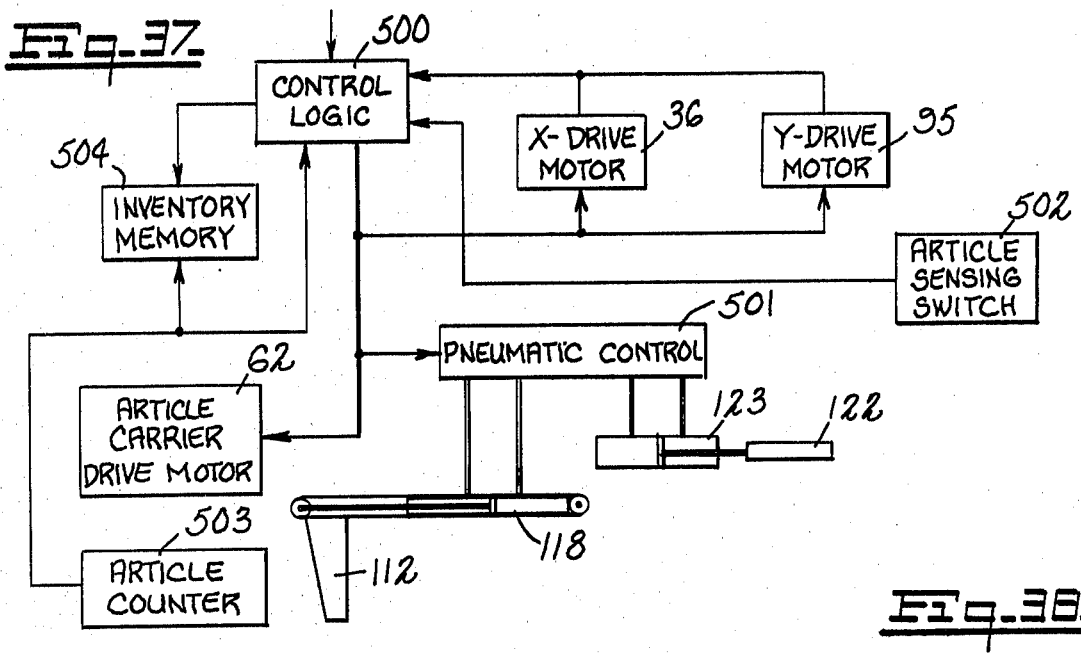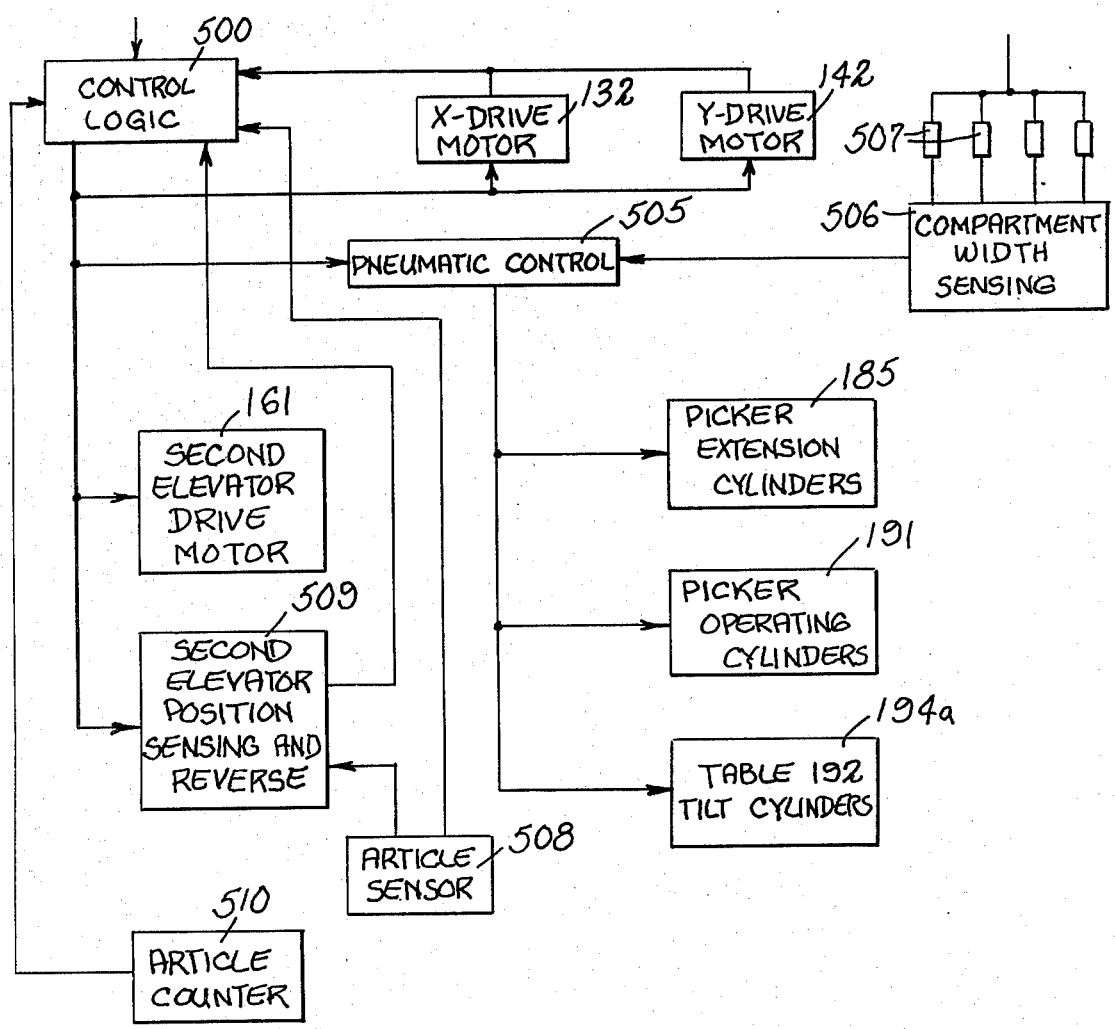

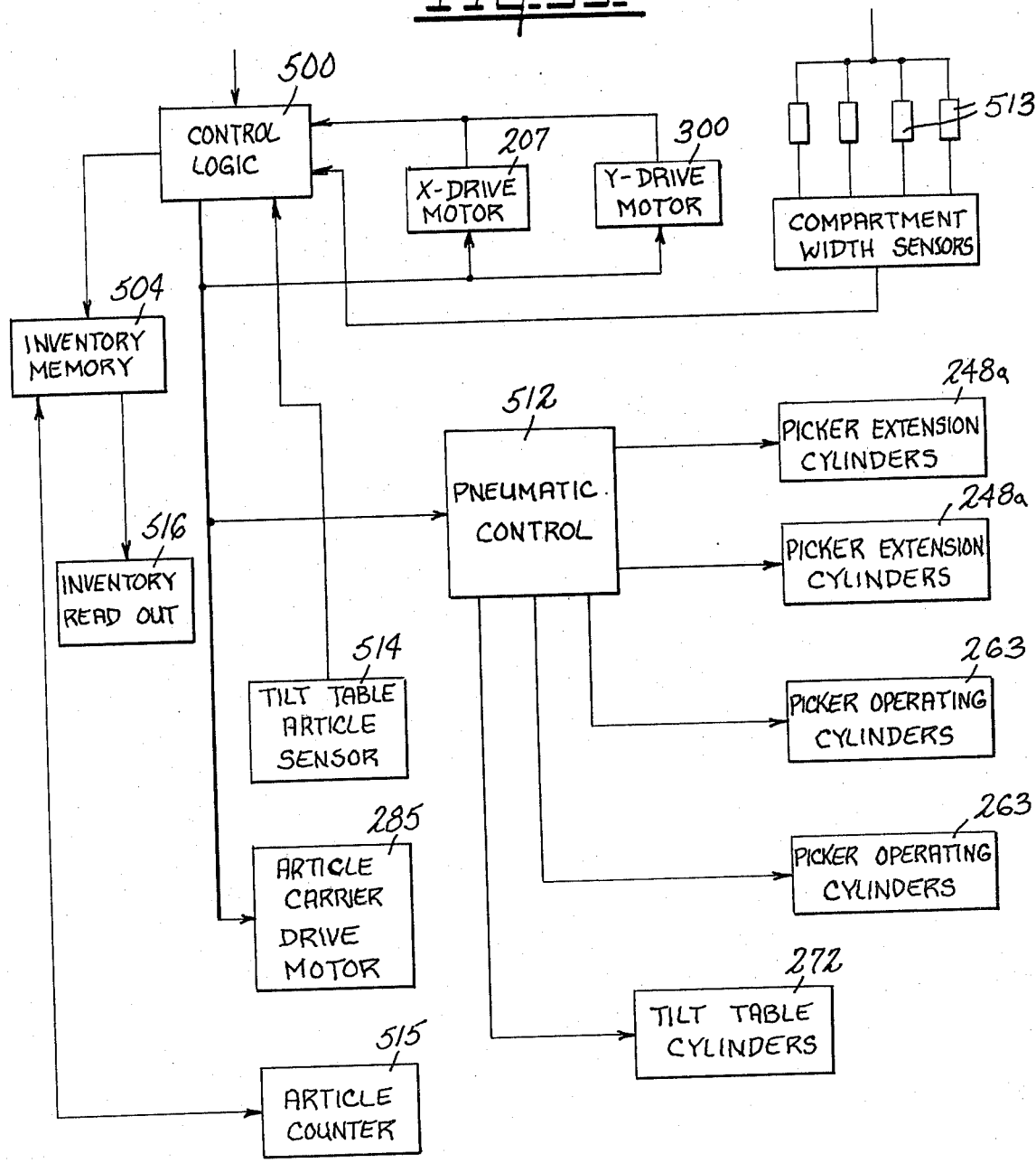

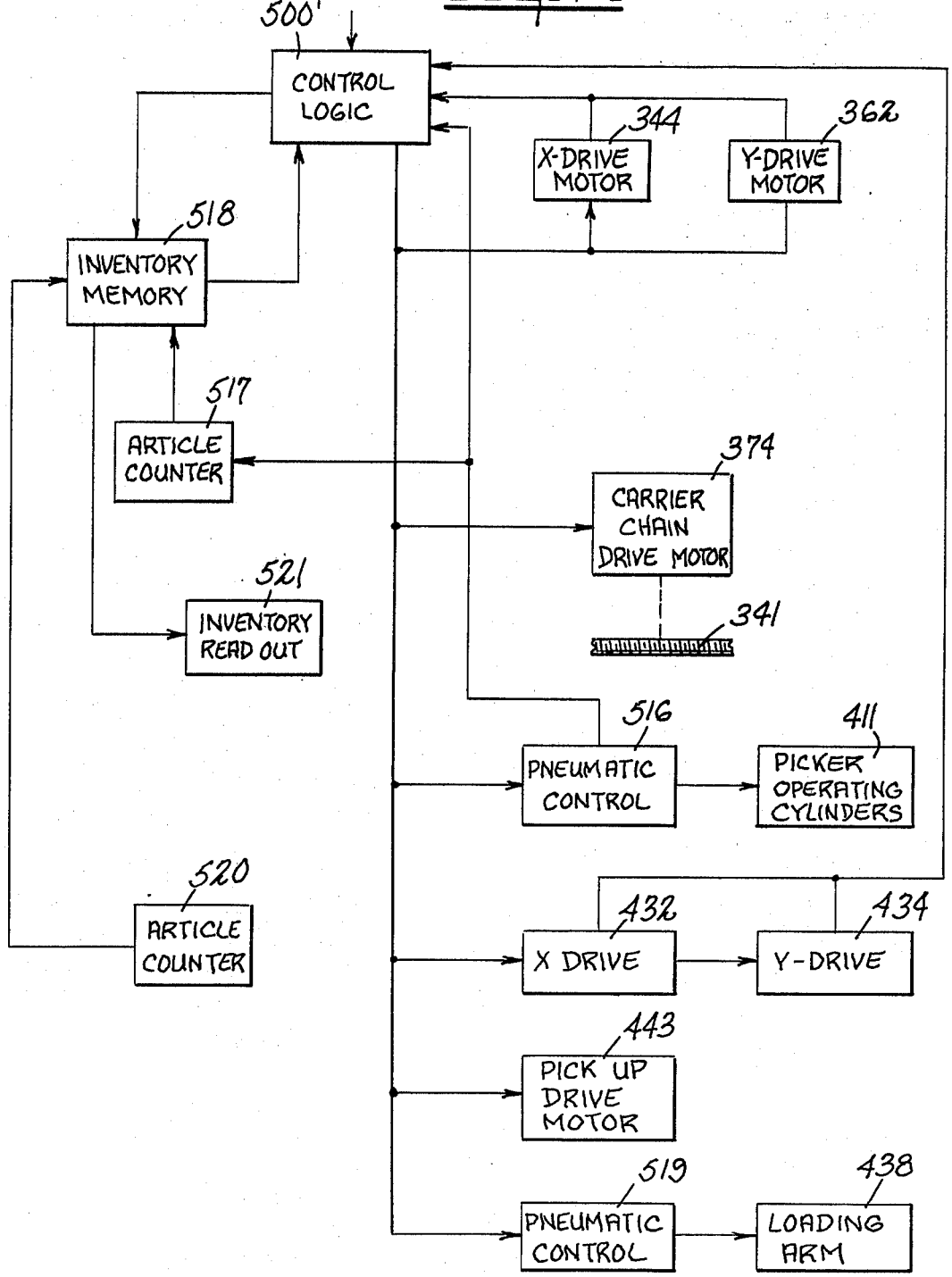

STORAGE SYSTEM

This is a continuation, of application Ser. No. 675,560, filed Apr. 9, 1976 which was a continuation of application Ser. No. 212,912, filed Dec. 28, 1971, both now abandoned.

This invention relates to storage systems and more particularly relates to storage systems having loading means for stocking storage shelves or compartments at one end thereof and unloading means for removing and transferring articles from the other end of such storage means.

The problem of maintaining an adequate inventory of an active plurality of articles for over a given period of time is one which is a concern to many types of business. A large portion of this problem is the necessity to rapidly store incoming articles to conserve available space, and the necessity of rapid location and removal of ordered articles to promptly fill orders and/or deliver goods. An additional important consideration is maximizing the usable storage space in a given volume and efficiently using the space in an organized manner.

The present invention is directed to providing a system which provides automatic loading of articles into an organized storage system of longitudinally extending compartments at one end thereof and unloading the articles at the other end thereof. The invention uses the facility of storage rack assemblies defining a plurality of columns and rows of inclined storage compartments so that stored articles move from a loading end to an unloading end under the influence of gravity. The invention further utilizes positive article-handling means which insures against any dropping or rough handling of articles to minimize or eliminate breakage problems. The organization of the invention further eliminates or minimizes the usual requirements for access aisle space.

Briefly stated, the invention in one form thereof provides at least one rack assembly defining a plurality of longitudinally extending article-receiving compartments. Loading or unloading conveyors are disposed at each end of the compartment. A loading mechanism which is positionable at any column of compartments includes conveyor off-loading and transfer mechanisms to transfer the articles to a given compartment in the selected column. Where the compartments are inclined, the articles move toward the unloading end until a stop or a previously stored article is engaged. An unloading mechanism is constructed to engage an article, lift it over an end stop and transfer the article to an out-loading conveyor. Where a plurality of rack assemblies are arranged in series, a transfer mechanism picks an article from a compartment of a first rack and transfers it to a compartment of the next rack.

The invention further comprises many new and improved mechanisms for article handling, transfer and supporting of articles.

An object of this invention is to provide a new and improved storage system.

Another object of this invention is to provide a storage system having new and improved means for loading articles into storage compartments and removing articles therefrom for transfer to a delivery point.

A further object of this invention is to provide new and improved mechanisms for any of the handling of articles, including initial transfer and loading, intermediate transfer between storage means, unloading of articles from storage, and transfer to a delivery means.

A still further object of this invention is to provide an inventory and storage system having new and improved means for assuring that articles are always handled on a first-in, first-out basis.

The features of the invention which are believed to be novel are particularly pointed out and distinctly claimed in the concluding portion of this specification. However, the invention both as to its organization and operation, and together with further objects and advantages thereof, may best be appreciated by reference to the following detailed description taken in conjunction with the drawings, wherein:

FIG. 4 is a view seen from above of a portion of the storage racks or bins of the systems of FIGS. 1 and 2;

FIG. 5 is a side elevation of the rack of FIG. 4;

FIG. 6 is a view seen in the plane of lines 6—6 of FIG. 5;

FIG. 7 is a view in elevation and partially cut away showing the article-loading apparatus;

FIG. 8 is a side elevation of the loading apparatus of FIG. 7;

FIG. 9 is an elevation of an article transfer apparatus;

FIG. 10 is a view of a portion of the mechanism of FIG. 9 showing the manner in which an article is off-loaded from the storage racks;

FIG. 11 is a view seen in the plane of lines 11—11 of FIG. 9;

FIG. 12 is a plan view of off-loading apparatus showing a tilt table utilized in directing the off-loading of articles;

FIG. 13 is a side elevation of the off-loading apparatus of FIG. 12;

FIG. 14 is an enlarged view of the apparatus of FIG. 13 seen from the front thereof and showing the manner in which the unloaded articles are directed to a transfer means;

FIG. 15 is an enlarged view of a portion of the apparatus of FIG. 14 showing the mechanism for unloading articles from the storage racks;

FIG. 16 is a view of the apparatus of FIG. 15 seen from the top thereof;

FIG. 17 is a view showing the transfer or pivot plate of the unloading apparatus of FIG. 12;

FIG. 18 is a view in perspective of the transfer plate;

FIG. 20 is a view of the apparatus of FIG. 19 seen in the plane of lines 20—20 of FIG. 19;

FIG. 21 is a view seen in the plane of lines 21—21 of FIG. 20;

FIG. 22 is an enlarged top view of the picker fingers shown in FIG. 20;

FIG. 23 is an enlarged view of a portion of a mechanism shown in FIG. 19;

FIGS. 24, 25 and 26 are enlarged side views of the picker fingers shown in FIG. 22 and exemplifying a cycle of operation thereof;

FIG. 27 is a view seen in the plane of lines 27—27 of FIG. 19;

FIG. 28 is a view seen in the plane of lines 28—28 of FIG. 27.

FIG. 29 is a side elevation of a mechanism adapted to place hangers on storage racks;

FIG. 30 is a front elevation as seen from the right of FIG. 29;

FIG. 34 is an enlarged top view of the loading finger shown in FIG. 30;

FIG. 35 is a view seen in the plane of lines 35—35 of FIG. 34;

FIG. 36 is a sectional view seen in the plane of lines 36—36 of FIG. 35; and

FIGS. 37, 38, 39 and 40 are schematic diagrams in block form of the controls for the various mechanisms.

Because of the length of a disclosure necessary to set forth an embodiment of this invention, the various systems and sub-systems which comprise an embodiment of the invention will be described under headings for facility and clarity of disclosure. However, it is to be understood that the disclosed embodiments of the invention are by way of illustration only and other mechanisms and devices in various arrangement may be utilized to provide the means and operation, and obtain the same result as the described embodiments of the invention.

GENERAL ARRANGEMENT

Figure 1:
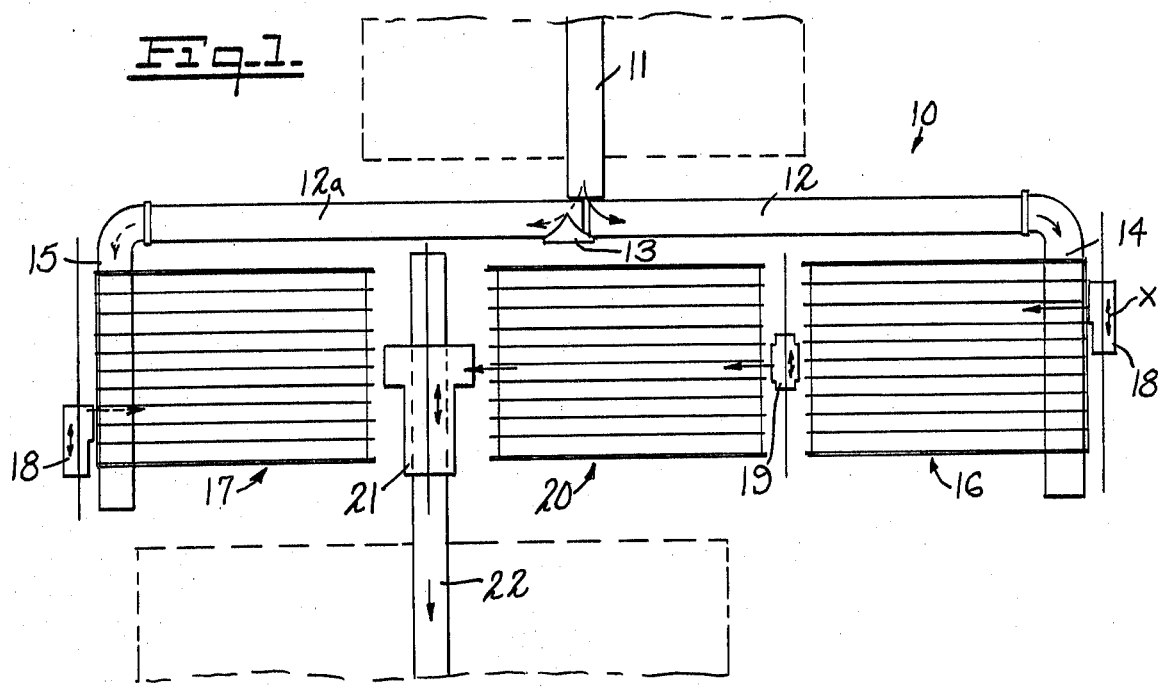
FIG. 1 is a top plan view in generally schematic form illustrating the layout of the invention.

A system embodying the invention is generally identified by the reference numeral 10. As shown in general schematic form in FIGS. 1 and 2 the system comprises a first transport means such as a conveyor 11 which directs articles to be stored onto a bi-directional transport means which may be in the form of conveyors 12 and 12a. An article-directing member 13 is positionable with respect to conveyor 11 to direct the articles either to the right or left thereof onto the conveyors 12 or 12a. As exemplified in FIG. 1, by the position of member 13 the article will be directed to the right of conveyor 11. Articles placed on the conveyors will be carried to either conveyor 14 or 15 and subsequent loading in storage bins or rack assemblies 16 and 17, respectively. As will hereinafter be more fully described, articles on conveyor 14 are accepted by an associated rack loading mechanism 18 and placed in the storage racks 16. A transfer mechanism 19 is arranged to accept articles from racks 16 and transfer such articles to an additional storage rack assembly 20. An unloading mechanism 21 is arranged to remove articles from either rack 17 or 20 and place such articles on an off-loading transport means such as a conveyor 22. An additional loading means 18 is utilized in conjunction with racks 17 and conveyor 15 to load articles from conveyor 15 into racks 17. As indicated by the directional arrows, the mechanisms 18, 19 and 21 are movable and positionable along the end of the racks 16, 17 and 20 to perform the loading, transfer and loading functions heretofore generally described.

Figure 2:
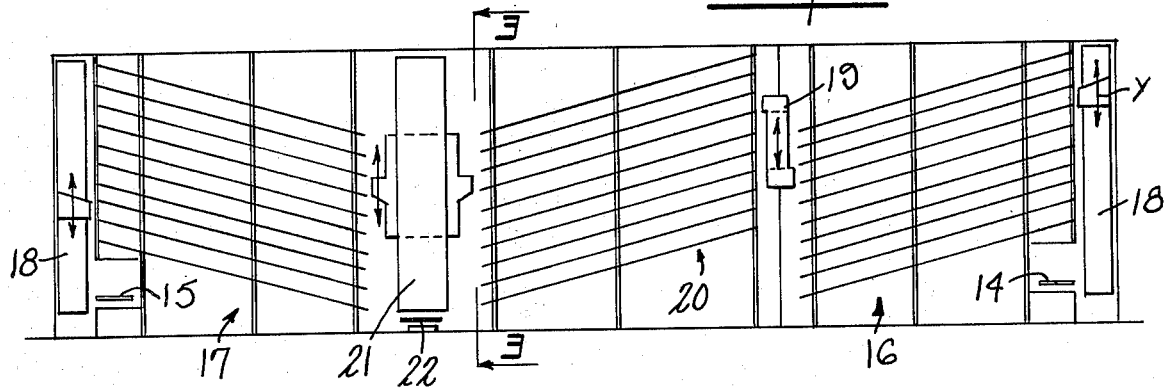
FIG. 2 is a front elevation of the apparatus of FIG. 1 in generally schematic form.
Figure 3:
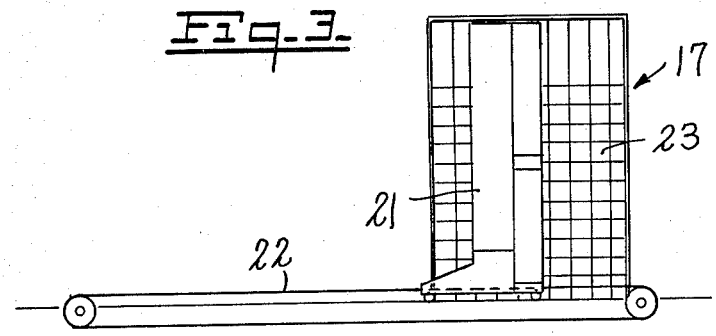
FIG. 3 is a view of an unloading apparatus seen in the plane of lines 3—3 of FIG. 2.

As exemplified in FIG. 2, the loading mechanisms 18, transfer mechanism 19 and unloading mechanism 21 have elevators thereon movable in the vertical direction to be positioned at a given rack opening. Each rack assembly provides a multiplicity of elongated storage compartments generally exemplified by the reference numeral 23 in FIG. 3 in a generally coordinate grid pattern. The compartments 23 are generally longitudinally directed and are preferably inclined downwardly from the loading end thereof adjacent a loading mechanism to the other end thereof adjacent the transfer mechanism 19 or the off-loading mechanism 21. With this arrangement, the articles will slide from the loading end of each rack toward the unloading end thereof under the influence of gravity.

Reference is now made to FIGS. 4, 5 and 6 for a more detailed description of the rack assemblies. The rack assemblies, as exemplified by the showing of a compartment 23, comprise a plurality of vertical support members 25 and lateral members 26 of progressively different height between the vertical support members 25. Each compartment 23 is defined by one or more lower support members or rails 27 and side or edge guide members 28 disposed outwardly of members 27. The members or rails 27 and 28 are positioned on and supported by the lateral members 26. The guide members 28 extend to a stop member 29 at the off-loading end of each compartment 23, while the lower guide rails terminate short of member 29 for purposes hereinafter made apparent.

All of the rack assemblies define a multiplicity of inclined longitudinal extending compartments 23 adapted to store a plurality of articles as exemplified by the box B. As exemplified, the members 26 may include a plate-like member 30 which extends into slots 31 in the members 27 and 28 to facilitate construction and positioning of the parts.

With this construction it will be noted that when an article such as box B is positioned onto the on-loading end of the rack assemblies and into a compartment 23 it will move downwardly on support rails 27 within the guide rails 28 of that compartment until it is stopped by stopping member 29 or a box or other boxes B already in that compartment. Thus, the articles once loaded are positioned towards the off-loading end of the racks and compartments under the force of gravity. Alternatively, each compartment 23 could include a conveying means for moving articles from a loading end to an unloading end.

LOADING MECHANISM

Means are provided at the loading end of each of rack assemblies 16 and 17 to remove articles from the associated conveyor, transport the removed articles to a selected compartment, and then transfer the articles to the selected compartments. The mechanisms are guidably moved in the horizontal or X-direction to a given column of compartments and carry elevators or transfer means movable in a coordinate Y-direction to a given row of compartments. Each mechanism 18 includes an article remover or pusher, an article-receiving table, one or more article carriers, and a transfer means to place the articles in the selected compartments.

Articles indicated by the box B in FIG. 7 are moved along conveyor 14, stopped at a given point, transferred to loading mechanism 18, and transferred to the loading end of a compartment 23.

As shown in FIGS. 7 and 8, loading mecanism 18 comprises a frame member 33 having upright structural members 33a–33d. Member 33 is movable along conveyor 14 and the loading ends of compartments 23 on wheels 34. Wheels 34 are mounted to an axle carried by member 35 which may include a gear box. A motor 36 drives the axle to move member 18 along conveyor 14 in the X-direction. The mechanism 18 is guided in upper guides 37 which receive therein trolley assemblies comprising a mounting member 39 with rollers 38 thereon.

The mechanism 18 includes one or more article carriers 40, an article-receiving and transfer means 41 movable in the Y-direction, and a conveyor-to-article carrier transfer means 42.

The article carriers 40 operate to pick up an article transferred to a receiving point such as table 43 on frame 33. Article carriers 40 then pick up and carry the article to transfer means 41. Transfer means 41, which is part of an elevator, will be positioned adjacent a predetermined compartment 23 and an article B may then be off-loaded into the predetermined compartment.

The article carriers 40 generally comprise a pair of spaced-apart arms 45 (FIG. 7) tied together with upper and lower bridging members 46 and 47. Carried on bridging members 46 and 47 and extending therefrom are a plurality of fingers 48 which extend outwardly from the bridging members to provide a supporting surface for an article B. A plurality of rollers 49 may be mounted to each of fingers 48 to support the article B and facilitate movement and transfer thereof. The outer extremities of fingers 48 are not joined, while the inner ends have upright portions 50 which are joined to the bridging members 46 and 47.

As will hereinafter be made apparent, the fingers 48 will pass between similar fingers on other receiving and transfer means and thus pick up or transfer an article.

Article carrier 40 has upper and lower rollers 51 and 52 on either side of arm 45 thereof. The rollers are received in vertical guideways 53 and 54 defined on members 33a–33d on either side of frame 33, and also move horizontally on guides as the direction of movement changes, as hereinafter described.

The shafts 55 upon which the rollers 51 are mounted are carried in an endless conveying means in the form of a pair of chains 56 each of which travel in a generally rectangular path about sprocket wheels 57–60. Two sets of the sprocket wheels 57–60 are provided, one for each of the chains 56. The sprockets 60 are mounted on a common shaft 61 (FIG. 7) rotatably supported by frame 33. Shaft 61 is driven by a motor 62 through a gear box 63. Gear box 63 provides a drive shaft having a pulley 64 thereon about which a chain or belt 65 extends to a pulley 66 on shaft 61. When motor 62 is energized it will drive shaft 61 to the aforementioned transmission and in so doing drive chains 56 to move article carriers 40 about the defined rectangular path.

Various guide means are provided to guide the article carriers 40 about the corners as they change from vertical to horizontal directions and vice versa. In addition to the upper and lower guide rollers 51 and 52 on the arms 45 an end guide roller 67 and an intermediate guide roller 68 are positioned on the outside of each arm 45 (see article carrier 40' in broken line in the lower portion of FIG. 8). Guide members 69 are supported at either side of the frame between pairs of upright members 33a, 33b and 33c, 33d, one of which is shown in FIG. 8. It will be apparent that as the upper arms of the carriers 40 commence to go around sprocket 58 there will be a tendency for the carriers to pivot about roller 51 under the influence of the load that they are carrying. To prevent such pivotal motion, guide arm 70 is pivotally mounted to guide member 69 and biased by spring 71 towards the position shown in broken line. A stop pin 72 is carried by member 69 to limit motion of member 70 about its pivot point.

As member 40 raises to the position indicated in broken line at 40'', guide roller 68 engages the arcuate edge of arm 70 and pivots arm 70 against the bias of spring 71 until arm 70 engages stop pin 72. Arm 70 prevents member 40 from pivoting. At the same time, roller 52 is moving over arcuate surface 73 on guide member 69 to horizontal surface 74 as member 40 changes from vertical to horizontal movement. As movement further progresses, guide roller 67 moves on to arcuate surface 75 towards horizontal surface 76 which is a lateral extension of surface 74. Roller 67 on surface 76 prevents pivotal motion of carrier 40 as roller 68 leaves arm 70. The guide rollers 67 and 68 need not be positioned as far outwardly from arm members 45 as guide roller 52.

Guide members 69 have extensions 77 with arcuate surfaces 78 upon which rollers 68 move to prevent pivoting of carrier 40 while changing from horizontal to vertical downward motion. Arcuate surface 70 provides a guide for roller 52 into vertical guideway 53. At the lower portion of frame 33, guide members 80 provide an arcuate guide surface 81 for rollers 52 as the rollers leave guideway 53 while carriers 40 change from vertical to horizontal motion. During lower horizontal movement rollers 52 ride on lower guide rails 82. As upward motion is commenced, rollers 52 ride on arcuate surfaces 83 of guide members 84. Thereafter the rollers 51 and 52 will enter guideways 54. The arcuate guide surfaces are generally formed on a radius.

Receiving and transfer means 41 move vertically on frame 33 to be in a position to transfer articles to predetermined compartments 23. Member 41 comprises a pair of spaced support members 87 which are secured at upper and lower points 88 and 89, respectively, to chains or belts 90 disposed about upper and lower sprockets 91 and 92, respectively (FIG. 8). The upper sprockets 91 are rotatably mounted on shafts 93 supported on either side of frame 33 while the lower sprockets 92 are mounted to a common shaft 94. Shaft 94 is driven by a motor 95 working through a gear box 96 to drive a pulley 97 and belt or chain 98 and a pulley 99 on shaft 94.

The support members 87 extend from a common bridging member 100. Also extending from bridging member 100 between the support members 81 are a plurality of fingers or arms 101 having upstanding end portions 102. A plurality of rollers 103 are mounted between member 100 and the end 102 of each arm 101. The rollers 103 and arms 101 are spaced apart a sufficient distance to allow the fingers 48 and rollers 49 of member 40 to pass therebetween in interdigitated relation. Thus, as the article carrier 40 moved downwardly and through member 41 the article B on the article carriers 40 will be retained on the rollers 103. The rollers 103 are driven as by means of a motor 104 carried on member 100. Motor 104 has a pulley 105 on the shaft thereof and through a belt thereover 106 drives small pulleys 107 on the ends of rollers 103 supported by member 100.

With this arrangement, after an article B has been received on the article-receiving and transfer means 41 or at the time it is received, motor 104 is energized to drive rollers 103 and move the article into the selected compartment 23. Alternatively, the rollers 103 may be continuously driven. The article will be received on the rails 27 and slide downwardly to stop 29 (FIG. 4) or until stopped by any previously placed article in that compartment.

It will be apparent that by energizing motor 95 and selecting the direction of operation thereof, the article-receiving member may be operatively positioned in the vertical direction to receive and transfer an article into any compartment along one vertical column of compartments.

Articles placed on conveyor 14 travel therealong until they engage stop rollers 110 extending outwardly from frame 33. Arms (not shown) extend outwardly from frame 33 to a support member 111. A depending member 112 mounted to support 111 together with frame 33 support rollers 110 therebetween. A limit switch, not shown, will be engaged or operated by an article when it reaches rollers 110 to actuate the pushing device hereinafter described.

A plurality of pushing devices 113 are normally disposed before stop rollers 110 and arranged to push articles onto receiving support or table 43 on frame 33. Table 43 comprises a plurality of finger-like members 115 having rollers 116 thereon oriented substantially perpendicular to the rollers of conveyor 14. The members 115 are oriented such that the fingers 48 of carrier 40 may interdigitate therewith and pass therebetween. In this manner an article placed on table 43 is transferred to a carrier 40 as the carrier moves upwardly through table 43.

Each of pushers 113 is carried on a pair of guide rods 117 (shown only in FIG. 8) extending between frame 33 and support 111. The pushers 113 are operated by cable cylinders 118 which include a cable 119. Cables 119 are moved in reversing directions about rollers 120 and 121 by cylinders 118 extending between frame 33 and support member 111. The pushers 113 are affixed to the cables and move therewith.

To prevent the possibility of the pushers transferring more than the desired number of articles to table 43 at one time, a stopping device or gate member 122 (FIG. 8) positionable by a cylinder 123, is provided to predetermine the distance between the stop rollers 110 and the end of member 122. The pushers 113 which do not act to push an article onto table 43 may act to hold articles against gate 122 to prevent any binding between the first article and a succeeding article, and prevent an article from moving behind an extended pusher. The pusher cylinders may be actuated when an article exerts sufficient force on rollers 110 to operate a pressure switch and retracted when such pressure is released. One or more of rollers 110 may be spring-biased toward gate 122, and pressure thereon utilized to operate the pushers.

To summarize the operation of the loading mechanism 17, as the articles B travel along conveyor 14 they will strike the stops 110; gate 122 has been set for an article of given dimension; the pusher cylinders 118 are operated to push the article onto table 43; the loading mechanism 18 has been previously to load articles in a compartment in a vertical column and the article-receiving and transfer mechanism 41 has been positioned for a particular compartment 23 in that column.

As an article carrier 40 moving in its rectangular path moves up through table 43 it will pick up the article thereon and thereafter follow the path as previously described in conjunction with FIG. 8 until it passes through receiving and transfer device 41, at which time the article is deposited on rollers 103. Rollers 103 operate to move the article into the selected compartment 23 where the article slides downwardly until stopped by a previously loaded article or stop 29.

This is repeated for the various compartments until all articles are placed in storage.

RACK ASSEMBLY TRANSFER

The storage racks are inclined and divided into sections for a two-fold purpose. The inclined compartments allow articles to be loaded at one end and move under the influence of gravity to the other end. To maximize the number of articles that can be stored in a given area and volume, the rack assemblies are made in sections so that there is a minimum of non-usable storage space beneath the lowermost level of compartments. The disclosed arrangement thereby optimizes the efficient use of storage space by providing in given installations a plurality of racks, serially arranged, with rack-to-rack transfer means in between. The transfer means is constructed and arranged to accept or pick articles from the unloading end of one compartment and transfer the articles to the loading end of a corresponding compartment in the next rack assembly.

In large installations having relatively high capacity storage, a series of inclined racks may be disposed between a loading mechanism as previously described and the off-loading mechanism. In such cases, a rack-to-rack transfer mechanism may be provided as exemplified by the transfer mechanism 19 of FIGS. 1 and 2. Such transfer mechanism is disposed between rack assemblies 16 and 20 and is adapted to unload an article from a compartment 23 of rack assembly 16 and transfer it to a corresponding compartment of rack assembly 20.

The transfer assembly 19 may generally comprise a frame member 130 having upright frame members 130a, 130b, 130c and 130d, as more clearly shown in FIG. 11. The frame assembly will further comprise horizontal structural members as shown in the drawings. Frame member 130 is movable by wheels 131 driven from a motor 132 through the gear box 133 which drives the axle of wheels 131.

The mechanism 19 is guided between rack assemblies 16 and 20 by means of a plurality of trolley assemblies 134 carried on brackets 135 and 135a extending from the frame members 130a–130d and received in spaced apart rails or guides 136 fixedly mounted to the upper portion of the rack assemblies. A first elevator 137 is movable vertically on guide rods 138a, 138b, 138c and 138d carried by upright members 130a–130d, respectively. Elevator 137 includes bearing members 139a, 139b, 139c and 139d movable on the rods 138a–138d, respectively, carried on upper cross members 140 and lower cross members 141.

Elevator 137 is moved vertically by means of a motor 142 driving pulleys 143 and 144 through a gear box 145 and belt or chain 146. Pulley 143 is mounted on the shaft of gear box 145, and pulley 144 is mounted to a shaft 147 which extends between lower horizontal frame members 148 and 149.

Also mounted to shaft 147 are sprocket wheels or pulleys 150 and 151 which engage chains or belts 153 (only one shown in FIG. 9) which are attached at one end to the upper portion of elevator 137 at 154 and at the other end to the lower end of elevator 137 at 155. Chains or belts 153 extend around sprocket wheels or pulleys 156 (only one shown in FIG. 9) carried on upper cross members 157 of frame 130.

With the arrangement described, the elevator 137 will move upwardly or downwardly on guide rods 138a–138d dependent upon the direction of rotation of motor 142. A second elevator 160 is movable on guide rods 138a–138d within the confines of elevator 137 in the same manner as described for elevator 137.

Elevator 160 carries a plurality of members (not shown) similar to 139a–139d which engage and move on guide rods 138a–138d.

Elevator 160 is moved in a vertical direction by means of a motor 161 mounted on frame member 141 which drives pulleys 162 and 163 through a gear box 164 and belt 165. Pulley 162 is mounted to the shaft of gear box 164 while pulley 163 is mounted to a shaft 166 carried between lower cross members 140 and 141 of elevator 137. Also mounted on shaft 166 for rotation therewith are sprocket wheels or pulleys 168 and 169 which drive chains or belts 170 (only one shown in FIG. 9). The chains or belts 170 extend about sprocket wheel or pulleys 171 carried on upper horizontal cross members 140 of elevator 137 and also about sprocket wheels or pulleys 168 and 169, on shafts 166. The upper end of chain or belt 170 is attached to an upper portion of elevator 160 at 173 and the other end is attached to a lower portion of elevator 160 and 174.

With this arrangement, elevator 160 may move up and down within the confines of elevator 137 in a direction dependent upon the direction of operation of motor 161.

The transfer mechanism 19 is adapted to have the first elevator 137 positioned to receive an article from a compartment of one of racks 16, place such article on the second elevator 160 which carries the article upwardly to the corresponding compartment of rack assembly 20 and then discharges the article into the corresponding compartment.

The first elevator 137 carries a mechanism for removing or "picking" an article from the unloading end of a compartment for transfer to the second elevator.

As shown more clearly in FIGS. 9 and 10, a picking member 180 has outer side frame members 181 and 182 which are slidable on rails or guides 183 on the inside of lower elevator frame members 141. The members 181 and 182 are moved by the pistons of cylinders 185. the pistons are pivotally connected at points 185a to side frame members 141 and the cylinders are connected to a shaft 186 carried between side members 181 and 182. A picking arm, generally indicated by the reference numeral 187, comprises a plurality of pairs 188 of armlike members, each pair carrying therebetween a plurality of rollers 189. The arm-like members 188 have recesses 190 (FIG. 9) therein to permit the picking arms 187 to be moved up under end stops 29 of each compartment and lift or pick an article from a compartment. The picking arms are raised (FIG. 10) and lowered (FIG. 9) by cylinder-piston assemblies connected between each of the arm pairs and a rod 186 across each arm of a pair.

When an article is "picked" from a compartment, it will move over rollers 189 to an article carrier 192 comprising a plurality of rollers 193 between arms 194 on second elevator 160 until a stop 195 is reached (FIG. 10). Then a cylinder-piston assembly 194a connected between the sides of elevator 160 and arms 193 moves the rollers to a horizontal position as shown in FIG. 9. Then motor 161 is energized to move elevator 160 to a position adjacent a corresponding compartment in rack assembly 20. Cylinder-pistons 191 tilt rollers 193 to the position shown in broken line in FIG. 9.

Elevator 160 is usually arranged to move a fixed distance between a receiving compartment on rack assembly 16 and a loading compartment on rack assembly 20.

When elevator 160 is in its uppermost position it is arranged to sense the width of the loading compartment, which will also be the width of the receiving compartment. Cylinders 196 are actuated to pivot levers 197 to engage rails 28 which are slightly longer than rails 27. If the levers 197 pivot a predetermined distance they will actuate switches, not shown in FIG. 9, which will indicate the distance between sensed rails 28. This intelligence is then utilized to actuate only the necessary cylinders 191 for a given number of pairs of arm members 188 dependent on the width of the compartment.

OFF-LOADING AND DELIVERY MECHANISM

The off-loading mechanism 21 provides a means for removing articles from selected compartments of rack assemblies 16 and 20, and then transferring the articles to and depositing the articles on conveyor 22 for delivery.

The off-loading mechanism comprises coordinate positioning means for locating a selected compartment, means for removing or picking an article from a selected compartment, and means for transporting the article to a delivery means which is exemplified as conveyor 14.

Reference is now made to FIGS. 12–18 for a description of the structure and operation of mechanism 21. The mechanism is arranged to straddle conveyer 22 and deposit articles thereon. As shown in FIG. 13, the mechanism basically comprises an elevator 200 which receives articles from the compartments of either of rack assemblies 17 or 20, one or more article carriers 201 which receive articles from elevator 200, an inclined table 202 which receives articles from carriers 201, and an inclined roller assembly 203 which delivers articles from table 202 to conveyor 22.

Frame or gantry 204 moves on forward and rear sets of wheels 205 and 206 over conveyor 22. The axle of wheels 205 is driven from a motor 207 through a gear box 208, pulleys 209, 210 and 211, and belts 212 and 213. Frame 204 moves along the length of conveyor 22 between rack assemblies 16 and 20. Frame 204 is guided by means of spaced apart upper guide rails 214 (only one shown) each of which is engaged by guide rollers 215 and 216 mounted to brackets 217 and 218 on the upper spaced apart longitudinal members 219 (only one shown in FIG. 13) of frame 204.

Elevator 200 comprises an upper portion having spaced apart members 220 and 221 (FIG. 14) to which are connected chains 222 and 223 for lifting and lowering purposes as hereinafter described. Members 224 and 225 extend downwardly to lower elevator portion 226.

Elevator 200 is moved on vertical guide rods 229–232. Guide rods 229 and 230 are carried in spaced relation between the upper and lower portions of frame 204. Guide rods 231 and 232 are carried by a cross member 233 on the lower portion of frame 204 (FIG. 12) and a similar member (not shown) on the upper portion of the frame 204.

The elevator has guide bearings or bushings 235 and 236 on upper and lower cross members 237 (FIG. 14) and 226 (FIG. 12) which move on guide rods 231 and 232. Similar guide bearings or bushings 239 and 240 move on rods 229 and 230.

In the embodiment disclosed, elevator 200 has extending arm portions 242 and 243 arranged to cooperate with each of rack assemblies 17 and 20, as shown most clearly in FIGS. 14, 15 and 16. The arm assemblies are arranged to pick an article from a predetermined compartment and transfer the picked article to a tilting transfer table 244 which then transfers the article to a support table 245, carried by elevator 200.

Arm 242 comprises spaced apart side frames 246 and 247. Carried therebetween is a movable article picking assembly 248 which comprises a roller coveyor 249 and a picking lever 250. The assembly 248 comprises side frame members 251 and 252, joined by appropriate cross members. A plurality of rollers 254 are rotatably carried between frames 251 and 252. The picking member generally comprises a plurality of pairs of crank-like members 255 and 256, each pair of cranks carrying a plurality of rollers 258 and 259 therebetween. Each of crank members 255 and 256 have recesses 257 defined therein to allow members 255 and 256 with rollers 258 and 259 thereon to reach under end stops 29 and elevate an article over the end stops of a compartment. Only the lever pairs 255 and 256 corresponding to the width of a given compartment are actuated as sensed by rods 261.

The remaining structure may best be appreciated from the operation of a picking cycle. When articles are to be picked from a compartment, the frame 204 and elevator 200 are coordinately positioned in the X and Y directions. Piston-cylinder arrangement 248a is actuated to extend assembly 248 on guides 260 on frames 246 and 247 until the ends of the compartments are sensed by rods 261 associated with each pair of cranks 255 and 256. Then air is applied to selected cylinders 263. When rods 261 are urged a predetermined distance against the bias of their springs 262 (FIG. 15) sensing switches, not shown in FIGS. 15 and 16, actuate associated piston-cylinder assemblies 263 to extend thier pistons 264 and move the cranks to the position shown in broken line in FIG. 15.

The articles will then move down the extended roller conveyor onto tilting table 244. The roller conveyor at one end thereof is attached to chains 265 and 266 which engage sprocket wheels 267 and 268, respectively. Wheels 267 and 268 are journaled on shaft 269 mounted to side frames 246 and 247. The sprocket wheels 267 and 268 are preferably spring-loaded in a direction to retract chains 265 and 266, respectively, yet permit rotation of the wheels when assembly 248 is extended for a picking operation.

Table 244 as shown in FIGS. 14, 17 and 18 is tiltable about a center point 270 to receive an article from one of arms 242 and 243 and then tilt to transfer the article to support table 245.

Table 244 has a plurality of ball rollers 271 thereon to facilitate movement of articles thereon and thereoff. Table 244 is controlled in its direction of tilt by a plurality of piston-cylinder assemblies 272 connected between the underside of the table and a member 273 extending between frames 246 and 247.

When an article is received on table 244, the table is then tilted to the position shown in FIG. 17 to allow the article to move down onto support table 245.

Table 245 has the same basic construction as table 43, shown in FIGS. 7 and 8, and need not be described in detail. It comprises a plurality of fingers having one free end to permit the passage of article carriers 201 therethrough. The article carriers 201 are similar in construction to article carriers 40, shown in FIGS. 7 and 8, but inclined slightly for reasons made apparent. Article carriers 201 are carried on chains 280, passed about sprocket wheels 281-284 and frame 204. The chains 280 are driven by a motor 285 through a gear box 286, pulley 287, belt 288, and a pulley 289 on the shaft of wheel 281.

The article carriers 201, being constructed as previously described for carriers 40, remain in the same relative orientation as the direction of travels shifts from vertical to horizontal and vice-versa by means of guide members 291, 292, 293, 294, 295 and 296. The actual movement and engagement of the guide rollers of article carriers 201 need not be further explained in view of the previous explanation of the guidance of the article carriers 40.

In operation, the mechanism 21 is positioned so that the arms 242 or 243 are adjacent a given column of compartments in rack assemblies 17 or 20. Then motor 300 is operated to raise or lower elevator 200 through chains 222 and 223. Chains 222 and 223 pass about upper sprocket wheels 301 and 302 and lower sprocket wheels 303 and 304 (FIG. 13). The lower sprocket wheels 303 are carried on shafts 305 (FIG. 12) on either of longitudinal frame members 204. Each of shafts 305 has a pulley 306 thereon connected by belts 307 to pulley 308 on shaft 309 which extends between members 219. Shaft 309 has a pulley 310 thereon driven by belt 311 from pulley 312 on the shaft of gear box 313.

When the elevator is positioned, cylinders 248a are actuated to extend picker arms 248 until the ends of rails 27 are sensed by rods 261. Then selected cranks 255-256 are pivoted upwardly by the cylinders 263, as determined by which of rods 261 are actuated. The levers 255-256 then lift the article over end stop 29 and the article, under the influence of gravity, moves over rollers 254 on arms 251-252 and rollers 263 on chains 265-266 to tilting table 244. Table 244 is then tilted to transfer the article to table 245. Then an article carrier 201 moves upwardly through table 245. As the article carrier subsequently moves downwardly through table 202, the article moves down inclined roller assembly 203 onto conveyor 22 and transferred to a delivery point.

ADDITIONAL EMBODIMENT

In some cases the articles in inventory or storage may be packaged and suspended on hangers, and the hangers picked from the storage compartments and transferred to an off-loading transport means.

Such an off-loading system, as exemplified in FIGS. 19-28, utilizes the same basic motions as previously described, namely, coordinate positioning, lifting or picking of an article over a compartment end stop, and transport to a delivery means.

Figure 19:
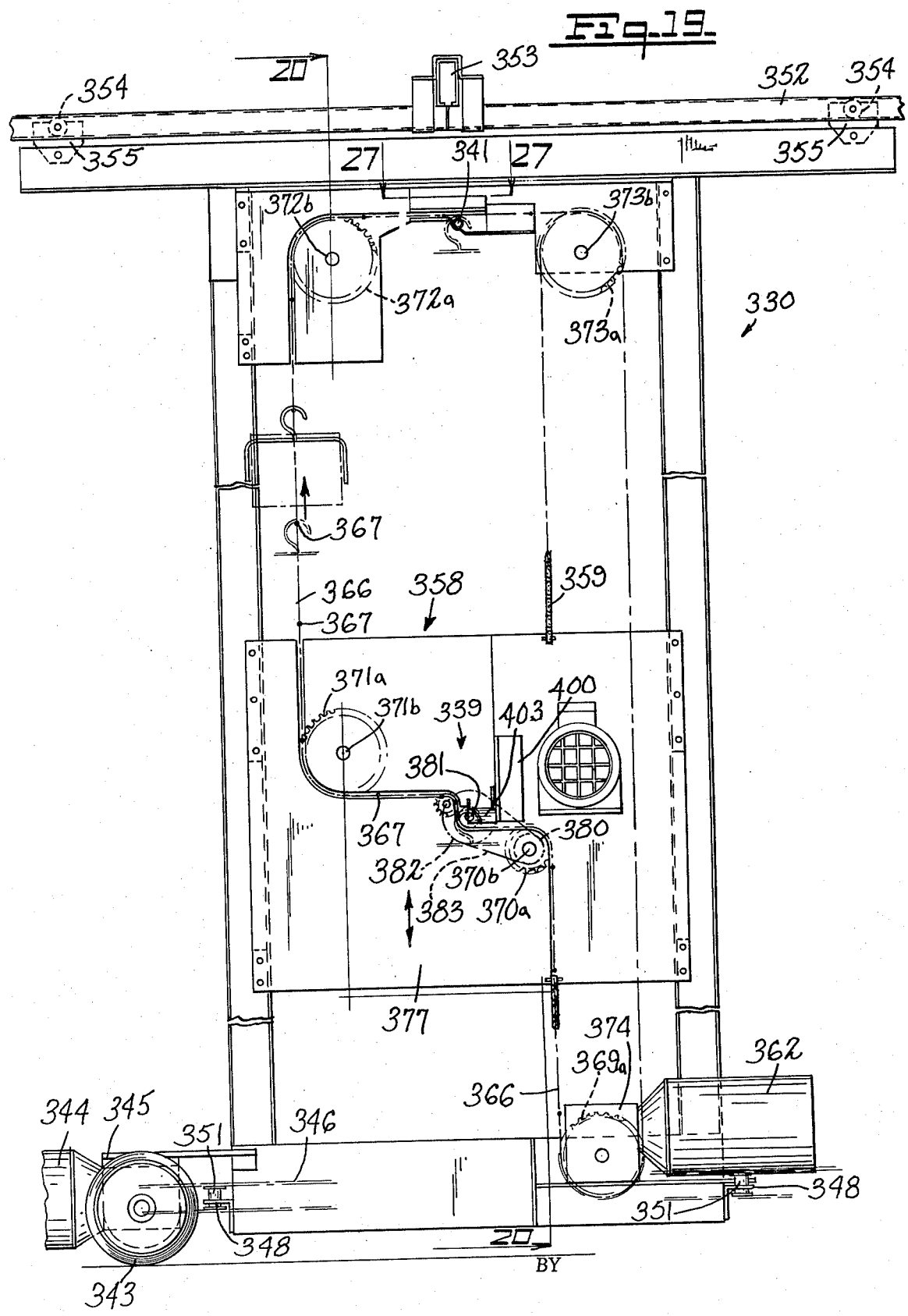
FIG. 19 is a side elevation of an unloading mechanism arranged to remove hangers from storage compartments.
Figure 31:
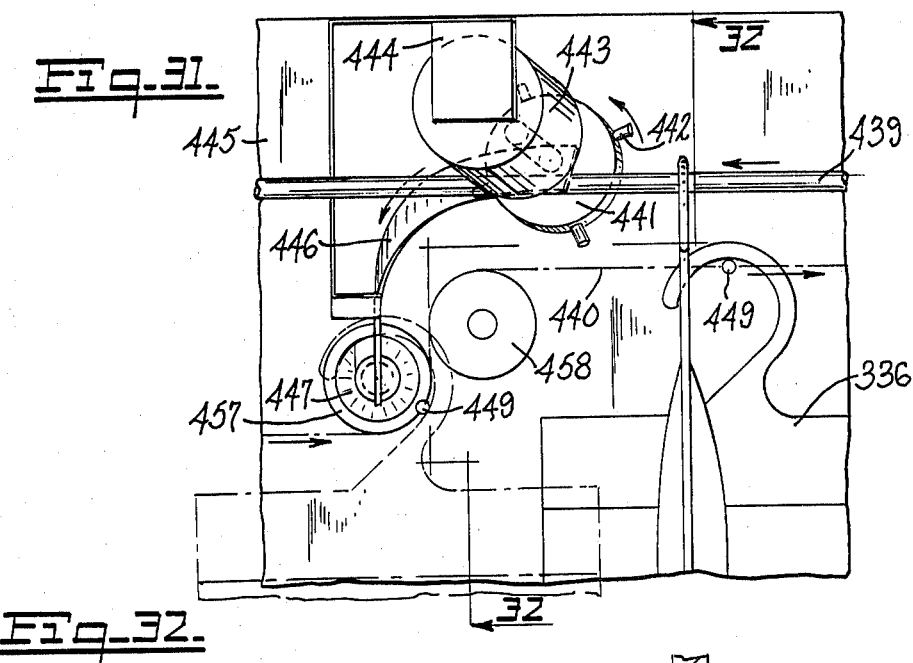
FIG. 31 is an enlarged view of a portion of FIG. 29 showing an article pick-up device.

FIGS. 19 and 20 illustrate an off-loading mechanism 330 which moves between the unloading end of rack assemblies 331 and 332 (FIG. 20). The assemblies 331 and 332 define a plurality of elongated, inclined storage compartments 333, each comprising a pair of lower guide rails 334 and an upper hanger rail 335 intermediate the lower guide rails. Hangers 336, with articles thereon, (not shown) are inserted on the loading ends of the hanger rails and the hangers 336 slide toward the unloading end under the influence of gravity. A stopping device 337 with an upstanding end 338 retains the hangers on the hanger rails. Alternatively, an upstanding end may be defined on the end of the rails.

The mechanism 330 is arranged to pick a hanger from a given compartment through picker assemblies 339 and 340 and transfer the hanger to a transport means and a transfer shaft 341. The hangers are then delivered to a delivery means 342 which may be a conveying belt or cable.

Mechanism 330 moves along the ends of assemblies 331 and 332 on a pair of wheels 343 driven by a motor 344 through a gear box 345. Alternatively, mechanism 330 may be driven through a chain and sprocket arrangement. Mechanisms 330 moves in a linear path on guides and side supports 346 illustrated as being on rack assembly 331. Arms 348 and 349 extend from mechanism 330 and carry rollers or bushings 351 thereon engaging guides 346. An upper guide 352 carried by cross members 353 receives a roller or bushing 354 carried on upwardly extending arm 355. With this arrangement mechanism 330 moves in a first coordinate or X-direction along the unloading ends of rack assemblies 331 and 332.

Mechanism 330 includes an elevator 358 which carries the picker assemblies 339 and 340. Elevator 358 is moved in the vertical by means of a chain 359 about sprocket wheels 360 and 361 (FIG. 20). Wheel 361 is driven by motor 362 through gear box 363.

Mechanism 330 further includes a pair of transport means in the form of endless chains 365 and 366, each having a plurality of spaced hanger carrying pins 367 extending outwardly therefrom. As is hereinafter described, the picker assemblies 339 and 340 are adapted to pick up a hanger and transfer it to a position where it is engaged by one of pins 367 and then carried on of chains 365 and 366 to transport shaft 341.

Chain 365 is passed about an idler sprocket wheel 369 (FIG. 20) on the shaft of gear box 363, sprocket wheels 370, 371, 372, 373 and back about wheel 369. Chain 366 passes about sprocket wheel 369a on the shaft of gear box 374 and sprocket wheels 370a, 371a, 372a and 373a. The sprocket wheels bearing similar reference numerals (except 369) are mounted on common shafts 370b, 371b, 372b and 373b carried between side frames 376 and 377 of elevator 358. Wheels 371 and 371a are independently journaled to frames 376 and 377, respectively. Pulleys 380 on shaft 370b turn a shaft 381 through a pulley 382 thereon and a belt 383. Shaft 381 has screw-like threads 384 and 385 on the ends thereof for purposes hereinafter described.

FIG. 21 illustrates the drive for transfer shaft 341. The shaft 372b has an extension 387 thereof carrying a pulley 388 thereon which drives a pulley 389 carried on bracket 390. A gear 391 rotates with pulley 389 and drives a gear 392 on transport shaft 341 to produce rotation thereof. Shaft 341 has a helical thread thereon which transports a hanger 336 along the length thereof to delivery means 342. A hanger picked by one of arms 339 or 340 is placed on shaft 341 on either side of mechanism 330.

The picking arms 339 and 340 are arranged to lift single hangers 336 from the various compartment hanger rails 335 and over the stops 338. The construction and operation of this picking or lifting mechanism is exemplified in FIGS. 22 and 24–27. As seen from above, each of the arms 339 and 340 includes a support member 400 extending from one of the side frames 376 or 377 and has attached thereto a channel-like member 401. Channel member 401 carries a shaft or pin 402 between the side walls thereof. Pivotally mounted to shaft 402 is a picking finger 403, also of generally channel or U-shape, having an upstanding rail 404. A locating finger 405 of slightly less length than rail 404 is also pivotally mounted about shaft 402 adjacent rail 404. A spring 406 is connected between finger 405 at 407 and member 401 at 408. As shown in FIG. 24, the connection of spring 406 is such that when finger 405 is in the position shown, the spring will tend to maintain it in such position. A lever arm 409 extends upwardly from member 403 and has connected thereto the piston 410 of a piston cylinder assembly 411. A stopping pin or lug 412 extends outwardly from one of the walls of member 401 and is adapated to engage the rear projecting ledge 413 of finger 405. When the piston cylinder assembly 411 is extended it will move member 405 from the position shown in broken line in FIG. 24 to the position shown in full line and simultaneously therewith spring 406 will move finger 405 until the surface 413 thereof engages stop 412. However, member 403, and more particularly rail 404 thereof, will move past the stop position of finger 405 to the position shown in FIG. 25. Rail 404 is slightly longer than finger 405 by a sufficient distance to pick up a predetermined number of hangers 336 from a rail 335. In the present embodiment, the difference in dimension is such that one hanger 336 will be picked off. At the same time, the end of finger 405 acts as a stop against a line of hangers 336 to prevent more than one from being engaged by rail 404. When the direction of operation of piston 410 is reversed, member 403 together with rail 404 thereof and finger 405 move towards the broken line position shown in FIG. 26 and the hanger 336 will slide down rail 405 onto sidewall or rail 414 of member 401 and, hence, onto transfer shaft 384 having helical screw-like threads or ridges thereon. Then the hanger 336 will move along shaft 384 towards the side frame 377 of mechanism 330. Then, as shown in FIG. 23, hanger 336 will be lifted by one of the pins 367 on chain 366. It will then move on pin 367 on chain 366 about wheels 371 and 372. As it moves horizontally after passing about wheel 372, the hanger will be moved outwardly along an inclined surface 416 on member 417, FIG. 28, and pushed off of pin 367 as it falls onto transport shaft 341. The hanger will then travel along transport shaft 341 to the right as viewed in FIG. 27 and off the end thereof onto outgoing conveying means 342 at which point it is translated 90°. The threads or helical ridges on transport 341 orient the hanger such that as it travels off the end thereof it will fall a short dimension onto transport conveyor or cable 342 and, hence, be carried to a delivery point.

Hangers picked up on the other side of mechanism 330 for rack assembly 332 are moved in a similar manner on pins 367 on chain 365 until an inclined surface 418 on a member 419 is reached adjacent the top of the mechanism. The hangers are then moved outwardly of the pins as shown and also dropped onto transport shaft 341.

The rails 335 of FIG. 20 may be loaded with the hangers 336 through the medium of a loading assembly 430, as exemplified in FIGS. 29–36. The loading assembly comprises a frame member 431 movable in the X-direction along the ends of the racks on a wheel, axle, motor, and gear box assembly 432 of the type previously described. Frame 431 carries an elevator 433 movable in the vertical or Y-coordinate direction. A motor, gear box assembly 434 drives a chain 435 about upper and lower sprocket wheels 436 and 437, respectively. Chain 435 at its ends is attached to upper and lower portions of elevator 433. Elevator 433 carries a telescoping loading finger or arm 438, hereinafter described in more detail, which is adapted to transfer hangers 336 to storage rails 335. The hangers 336 are fed to mechanism 430 along an in-loading delivery means 439, such as a belt or a cable, then to a pickup on a transport chain 440 and transported to transfer arm 438, as shown more clearly in FIG. 31.

Figure 32:
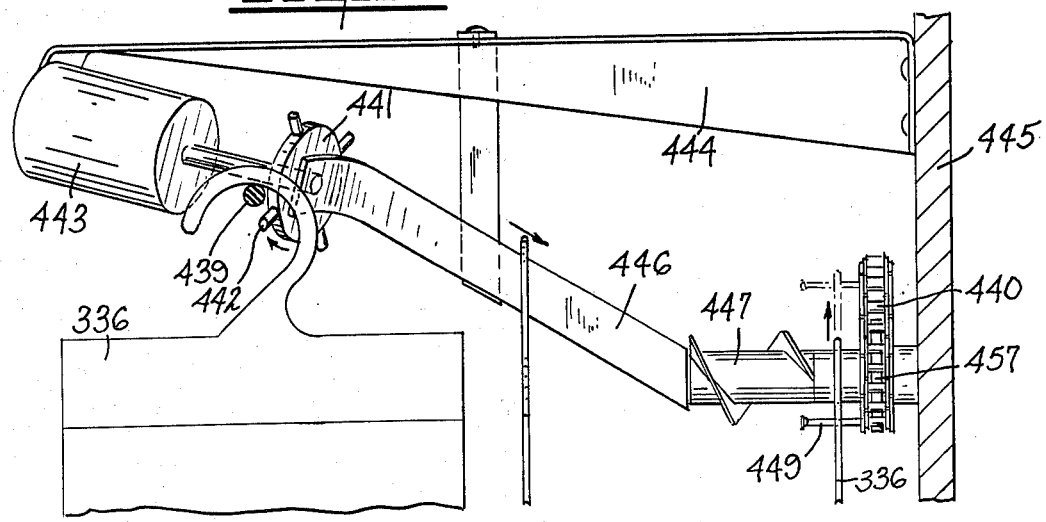
FIG. 32 is a view seen in the plane of lines 32—32 of FIG. 31.
Figure 33:
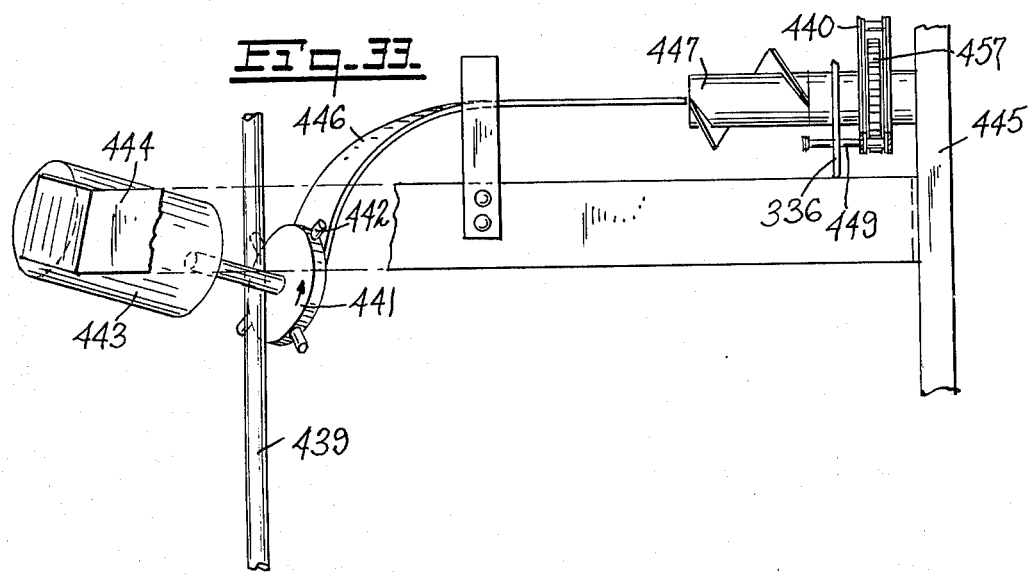
FIG. 33 is a top view of the mechanism of FIG. 32.

A hanger traveling on line 439 moves past a pickup wheel 441 having short fingers 442 thereon, which engage the hanger and lift it off of line 439. As shown in FIG. 32, wheel 441 is driven by a motor 443 carried on a bracket 444 extending from a lower side frame member 445 of mechanism 430. As wheel 441 rotates, the hanger is engaged with transfer rail 446 and slides downwardly thereon to transfer shaft 447 having helical thread-like members. Shaft 447 turns with sprocket wheel 457. The hanger will then move inwardly on shaft 447 and until engaged by a pin or finger 449 on chain 440. When the hanger is picked up on chain 440, it is then transported to transfer arm 438. Chain 440 extends around sprocket wheels 451, 452, 453, 454, 455, 456, 457 and 458. The chain is driven by a pulley connection 459 from a motor, pulley, gear box, drive 460 and carried on the lower portion of member 430. It will be noted that the transport chain 440 extends about the sprocket wheels on both the frame member and elevator 433 to maintain tautness therein as the elevator 433 moves in the vertical direction.

Reference is now made to FIG. 34 which is a top plan view of the transfer or loading arm shown with a carrier pin 449 on chain 440 approaching. As the pin 449 changes to a horizontal direction moving about wheel 452, it will for a short distance move parallel to an unloading or discharge member 462 which has an inclined surface 463. As the hanger moves along the inclined surface it is moved outwardly on pin 449 and be turned off of pin 449 so that it will fall onto loading arm 438.

Arm 438, as shown in section in FIGS. 35 and 36, comprises an outer tubular member 465 and an inner telescoping member 466 which is of semi-cylindrical shape along its outer extremity and disposed partially about an inner guide 467 secured to the outer member 465 as by means of one or more bolts 468.

As shown more clearly in FIG. 35, the outer extremity of member 466 is adapted to be extended over the loading end of rail 335. The inner member 466 is extended under the influence of fluid pressure introduced into chamber 470. Member 466 is then retracted under the bias of spring 471 acting between member 467 and the inner end 472 of member 466 and the fluid pressure is exhausted or reduced in chamber 470.

In operation, the mechanism 430 is moved in the X-direction to a given position adjacent a column of rails 335. Then elevator 433 is positioned in the Y-direction. Then the articles to be loaded on the selected rails are placed on incoming transport line or belt 439 from a pickup wheel 441 and fingers 442 pick up the incoming hangers and transfer them to slide or rail 446 and, hence, to screw shaft 447. Then the hangers are individually picked up on the pins 449 on chain 440 and carried up to loading arm 438 and then transferred thereto by the inclined surface 463. At this time the arm 438 has had portion 466 thereof extended to and slightly overlapping rail 335 and the hangers slide down arm 438 and on down onto rail 335. When all of the articles to be loaded on a given rail have been delivered thereto, the extended portion of arm 438 is retracted and mechanism 430 and elevator 433 thereon move to the next location for another loading operation.

CONTROLS

The controls for the sequencing of operations comprise combinations of commercially available elements connected to produce operations in a given sequence. In all cases the first operation is to move a mechanism in the horizontal or X-direction to a column of compartments while simultaneously moving an elevator or transfer table in the vertical or Y-direction to a predetermined row of compartments. Then, depending on the mechanism, a given sequence of operations is performed. The system may be controlled manually. However, it is preferred to place the overall operation under the control of a small general purpose computer which has been programmed in accordance with the desired operations, or to provide a hard wired logic network which provides command signals in predetermined sequences.

The control of the loading mechanism 18 is shown in FIG. 37. Command signals may be supplied to a control logic network 500 from a source such as punched or magnetic tape, keyboard or other input device which would include X and Y position, size of articles to be loaded and, in some cases, the number thereof.

The control logic supplies positioned signals to the X-direction drive motor 36 and the y-direction motor 95 which drives article carrier 41 in the vertical direction. Associated with the motors 36 on the gear box drive shafts are encoders or quantizers which supply position feedback signals to control 500, and when the commanded position is reached the drive motors will be de-energized.

After the initial positioning has been accomplished, the control 500 supplies signals to a pneumatic control 501, which may comprise electrically operated valves to actuate cylinder 123 to position gate 122 for the size articles to be loaded. As the articles reach stop 110 a switch 502 is closed and cable cylinders 118 are actuated to have pushers 112 push articles from conveyor 14 onto table 43. Article carrier drive motor 62 is energized to move the article carriers 40 in its or their defined path as previously described. An article counter 503 which may count the number of times the pushers are operated, the number of articles deposited on table 43 or any other repetitive loading operation may supply signals to an inventory memory 504 which also receives compartment positional information from control 500. In this manner, a record is kept of the number of articles loaded in a particular compartment and, hence, the number of such articles placed into inventory. As is hereinafter described, the number of articles in inventory may be continuously monitored by decrementing the inventory memory as articles are removed.

The control for the transfer mechanism 19 may also emanate from control logic 500 which supplies command signals to the X-drive motor 132 to position the transfer mechanism along a column of compartments and the Y-drive motor 142 which positions the first elevator 137. This control is shown in FIG. 38. When this occurs a signal is applied to another pneumatic control 505 which will actuate picker extension cylinders 185 when the second elevator 160 is in a down position. Selected ones of the picker-operating cylinders 191 are actuated dependent upon the width of the compartment sensed from a sensing network 506 responsive to switches 507 operated by levers 197 and cylinders 196 (FIG. 9). Then the table tilt cylinders 194a are operated to incline the table on elevator 160 and the picked article rolls downwardly onto the second elevator. Then an article sensor 508 which may be in the form of a switch on table 192 is closed by the article. A signal indicative thereof is applied to pneumatic control 505 and control 500 which lowers table 192. A signal is also applied to the second elevator position sensing and reverse network 509 which may merely be a coincidence gate or static switch. Report of this condition may then be applied to the control logic 500 which will move the second elevator to a position as shown in FIG. 9 to discharge the article into a compartment in rack assembly 20. As previously described, the second elevator 160 may have a fixed distance of travel and when such position is reached a limit switch so signifies and the pneumatic control again operates the tilt cylinders 194a to discharge the article into the selected rack compartment 23 in rack assembly 20. After a predetermined number of transfers an article counter 510 signifies that a predetermined number of articles have been counted to control 500 and the entire operation may then be disabled. It is to be understood that the various cylinder and piston assemblies will be under the control of preferably electro-pneumatic valves which are actuated in response to commands from the control logic or local sensing devices, such as pressure or limit switches. Then such valves will be actuated upon the happening of various coincidence or non-coincidence conditions, or in some cases may be actuated and then de-actuated after a preset time delay. The actual connections, both electrical and pneumatic, will be apparent to those skilled in the art. In an initial loading operation involving two sets of racks 16 and 20 with the transfer device therebetween, it will be understood that the operation of the transfer mechanism 19 may be slaved to the operation of the loading or unloading device so that all corresponding compartments on both rack assemblies may be fully loaded.

The control of the unloader 21 (FIG. 39) is similarly arranged under the supervision of the control logic network 500. Initially the X and Y drive motors 207 and 300 are operated to position the unloader at a given compartment. When this occurs, a signal is applied to a pneumatic control 512 which operates the picker extension cylinders 248a. At this time, a plurality of switches 513 are operated by the push rods 261 to determine the width of the compartment and, hence, the number of picker-operating cylinders 263 to be actuated, and the tilt table cylinders 272 are selectively actuated to position the tilt table 244. Then the picker-operating cylinders 263 are operated to pick the article from the compartment 23. As the article rolls down onto tilt table 244, an article sensor 514 thereon, which may be in the form of a pressure switch, signifies to control logic 500 that an article is on the table and the control then causes the pneumatic control to selectively operate the tilt table cylinders 272 to allow the article to move out onto receiving table 245 and, hence, be picked up by an article carrier 201. An article counter 515 which may be a switch on tilt table 244 or a pressure switch associated with receiving table 202 signifies the number of articles unloaded to inventory memory 504. An inventory readout or printout device 516 may be coupled to inventory memory 504 so that an inventory status may be determined at any time.

FIG. 40 exemplifies the complete control for the additional embodiment which is utilized with the hangers. For an unloading operation, a command is given to control logic network 500' which positions mechanism 330 through the X-direction drive motor 344 and the Y-direction drive motor 362. When such positioning is accomplished, the control logic 500' may signify the carrier chain drive motor 374 to commence movement of the chains 365 and 366 and also through the gearing arrangement, the transport shaft 341. Then a signal is applied to a pneumatic control 516 which, as previously described, may be an electro-pneumatic valve to repetitively operate the picker operating cylinder 411. An article counter 517 may be coupled to the electro-pneumatic control to count the number of articles picked and supply such signal to an inventory memory 518. After a predetermined number of articles have been loaded, the inventory memory may so signify to control logic 500' which will then follow the next command.

In loading, the mechanism 430 is positioned to bring loading arm 438 to a loading position through X-drive 432 and Y-drive 434.

When such positioning is accomplished, a signal may be applied to pickup drive motor 443. Then a signal is applied to pneumatic control 519 which extends portion 466 of loading arm 438. Thereafter, the article hangers will be rapidly loaded into the selected rail 335. An article counter 520, which may take any convenient form, such as a photoelectric control mounted any place on the photoelectric sensor, would be passed by an article hanger and supplies a count to inventory memory 518. After a predetermined number of articles have been loaded the inventory memory may so signify the control logic which will shut down the loading operation. An inventory readout device 521 may be coupled to the inventory memory to readout the inventory at any time.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A storage and removal system for articles suspended on a hanger comprising a plurality of rails inclined downwardly from a loading end to a removal end, each rail adapted to fully support hangers thereon with the articles therebelow, hangers on said rails, an upstanding stop on the ends of the rails to retain hangers thereon, the ends of said rails being arranged in coordinate columns and rows, a carriage having an elevator thereon movable vertically to a rail of a given row, means for moving said carriage to rails of a given column, an unloading member having an inclined stationary portion and a movable portion extending from said elevator, said movable portion arranged to pivotally move with respect to said elevator to lift a hanger over a stop and transfer a lifted hanger to said stationary portion whereby the hanger slides down said inclined stationary portion to a lower transfer position on said elevator, means for moving said unloading member to lift and transfer a hanger, and means for moving said elevator vertically on said carriage, conveyor guide means on said carriage and said elevator mounting on endless conveyor means thereon and defining a continuous closed path for said conveyor means in a generally vertical plane, said closed path including a predetermined path on said elevator whereby said elevator may move vertically on said carriage and said conveyor means follows said predetermined path on said elevator in all positions of said elevator, said predetermined path being adjacent said lower transfer position, means on said conveyor means for engaging and lifting an article at said transfer position, means for moving said conveyor means on said guide means and means for moving said elevator on said carriage.

2. The system of claim 1 wherein said movable portion of the unloading member includes means for limiting the number of hangers that may be lifted in one motion.

3. The system of claim 1 further including a plurality of hanger carriers movable in a continuous path on said carriage and said elevator, and means at said other end of said stationary portion at the elevator arranged to receive hangers from said stationary portion and transfer the hangers to a location to be picked up by said hanger carriers.

4. The system of claim 1 wherein said movable portion of the unloading member comprises a first rail member pivotal from a position below a hanger rail end to an inclined position above said rail end, another member pivoted about the same axis as said rail member and movable therewith toward an upward inclined position, means limiting downward pivotal motion of said another member so that said another member is located at said hanger rail end, said movable member extending beyond said another member by a predetermined dimension so as to lift only a predetermined number of said hangers.

5. A storage and removal system for articles suspended on hangers comprising first and second assemblies of hanger rails inclined downwardly from loading ends to a removal end, said first and second assemblies being downwardly inclined toward each other and defining a path therebetween, an upstanding stop on the ends of the rails, the ends of said rails being arranged in coordinate columns and rows, a carriage having an elevator thereon movable in said path to a rail of a given row, arm-like members extending from both sides of said elevator, said arm-like members being mounted to pivot below a hanger and upwardly to an inclined position to lift a hanger over the stop and allow the hanger to slide to the other end of said arm-like member, a plurality of hanger carriers movable in a continuous path on both sides of said carriage and said elevator, said carriers adapted to pick up hangers at said other end of said arms, a single transfer shaft extending on both sides of said carriage at a location below a path of travel of said carriers, and means for moving the hangers off of said carriers at said location so that hangers from said carriers fall onto said transport shaft in a hanging position on both sides of said carriage.

6. A storage and removal system for articles supported on inclined rails arranged in columns and rows and having stops thereon at a lower unloading end thereof comprising, a carriage movable along said unloading ends of said rails to rails of a given column, an elevator on said carriage vertically movable thereon to a given rail of a column, an article transfer position on said elevator, means for transferring a hanger from a rail to said transfer position, an endless conveyor means, conveyor guide means on said carriage and said elevator mounting said conveyor means thereon and defining a continuous closed path for said conveyor means in a generally vertical plane, said closed path including a predetermined path on said elevator whereby said elevator may move vertically on said carriage and said conveyor means follows said predetermined path on said elevator in all positions of said elevator, said predetermined path being adjacent said transfer position, means on said conveyor means for engaging and lifting an article at said transfer position, means for moving said conveyor means on said guide means and means for moving said elevator on said carriage.

7. The system of claim 6 further including hangers, said articles supported on said hangers, said means on said conveyor means are pin-like members extending therefrom, said predetermined path comprising a path generally horizontally beneath said transfer position and then upwardly whereby said pin-like members engage said hangers at said transfer position and then lift the hanger from said transfer position.

8. The system of claim 6 further including hangers, said articles supported on said hangers on individual rails, said transferring means comprises a stationary arm and a movable arm, said movable arm movable to an inclined position to lift a hanger over a stop whereby the hanger slides down said movable arm and said stationary arm to said transfer position.

9. The system of claim 6 further including further transfer means extending transversely to and in fixed relation to said carriage adjacent the upper portion of said carriage, and arranged to receive articles from said conveyor means.

10. The system of claim 9 further including hangers, said articles supported on said hangers, and said hangers are moved to said further transfer means from said conveyor means.

11. A storage and removal system for articles suspended on a hanger comprising a plurality of rails inclined downwardly from a loading end to a removal end, each rail adapted to fully support hangers thereon with the articles therebelow, hangers on said rails, means at the end of the rails to retain hangers thereon, the ends of said rails being arranged in addressable horizontally and vertically spaced positions, a carriage having an elevator thereon movable to a rail of a given vertical position, means for moving said carriage and elevator to a given rail of a given horizontal and vertical position, an unloading member on said elevator having an inclined stationary portion, means to transfer a hanger from the removal end of a rail to said stationary portion whereby the hanger slides down said inclined stationary portion to a lower transfer position on said elevator, an endless conveyor, conveyor guide means on said elevator and carriage mounting said conveyor to move in a closed path including a predetermined path on said elevator adjacent said transfer position whereby said elevator may move vertically on said carriage and said conveyor follows said predetermined path on said elevator in all positions of said elevator, said conveyor including hanger carriers thereon adapted to engage and remove hangers at said transfer position.

12. The system of claim 11 wherein said means to transfer includes means for simultaneously transferring a limited number of hangers.

13. The system of claim 11 further including means at the lower end of said stationary member arranged to receive hangers from said stationary member and transfer the hangers to a location to be picked up by said hanger carriers.

14. A storage and removal system for articles supported on inclined rails arranged in addressable horizontally and vertically spaced positions, comprising means for retaining said articles in succession thereon at a lower unloading end thereof, a carriage movable along said unloading ends of said rails, an elevator on said carriage vertically movable thereon to a rail of a given vertical position, means for transferring an article on a rail to a transfer position on said elevator, an endless conveyor means, conveyor guide means on said carriage and said elevator mounting said conveyor means thereon and defining a continuous closed path for said conveyor means in a generally vertical plane, said closed path including a predetermined path on said elevator whereby said elevator may move vertically on said carriage and said conveyor means follows said predetermined path on said elevator in all positions of said elevator on said carriage, said predetermined path being adjacent said transfer position, means on said conveyor means for engaging and removing an article at said transfer position, means for moving said conveyor means on said guide means, and means for moving said elevator on said carriage.

15. The system of claim 14 further including hangers, said hangers supporting said articles, said means on said conveyor are pin-like members, said predetermined path comprising a path generally horizontally beneath said transfer position and then upwardly whereby said pin-like members engage said hangers at said transfer positions and then lift said hangers from said transfer position.

16. A storage and removal system for articles comprising a plurality of elongated storage compartments inclined downwardly from a loading end to a removal end, each compartment adapted to fully support articles in succession, means to retain said articles in succession, the ends of said compartments being arranged in addressable horizontally and vertically spaced positions, a horizontally movable carriage having a vertically movable elevator thereon, means for addressing and moving said carriage and elevator to any of said spaced positions, an article transfer member having an end extending from said elevator adjacent an end of said compartment at any of said spaced positions, means for effecting article transfer between said respective adjacent ends and moving an article to a transfer position on said elevator, an endless conveyor, guide means for said conveyor on said carriage and on said elevator defining a predetermined path for said conveyor on said elevator adjacent said transfer position whereby said elevator may move vertically on said carriage and said conveyor follows said predetermined path on said elevator in all positions of said elevator, and means on said conveyor for engaging and removing articles at said transfer position on said elevator.

17. The system of claim 16 wherein said means for effecting transfer includes means for limiting the number of articles that may be transferred in one transfer operation.

18. The system of claim 16 including further conveyor means for a plurality of articles movable in a continuous path on said carriage at an upper transfer location on said carriage relative to said means for effecting transfer, and means for effecting article transfer from said endless conveyor to said further conveyor at said upper transfer location.

* * * * *

UNITED STATES PATENT AND TRADEMARK OFFICE
CERTIFICATE OF CORRECTION

PATENT NO. : 4,307,988
DATED : December 29, 1981
INVENTOR(S) : Peter H. Page et al It is certified that error appears in the above-identified patent and that said Letters Patent are hereby corrected as shown below:

Column 4, line 61 delete "mecanism" and substitute therefor --mechanism--.

Column 7, line 56 insert --positioned-- after "previously".

Column 9, line 41 delete "the" (second occurrence) and substitute therefor --The--.

Column 13, line 29 insert --one--after "carried on".

Column 16, line 26 delete "y-direction" and substitute therefor --Y-direction--.

Claim 3, line 18 insert --conveyor means on said-- before "carriage".

Claim 6, line 65 delete "a hanger" substitute therefor --an article--.

Signed and Sealed this

Ninth Day of November 1982

[SEAL]

Attest:

GERALD J. MOSSINGHOFF

Attesting Officer   Commissioner of Patents and Trademarks